US012732853B2

(12) United States Patent
Manolakos et al.

(10) Patent No.: US 12,732,853 B2
(45) Date of Patent: Sep. 8, 2026

(54) INTER-REFERENCE SIGNAL RESOURCE USAGE FOR CARRIER PHASE MEASUREMENTS

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US); Fnu Siddhant, Bangalore (IN); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 18/718,757

(22) PCT Filed: Dec. 20, 2022

(86) PCT No.: PCT/US2022/082080
§ 371 (c)(1),
(2) Date: Jun. 11, 2024

(87) PCT Pub. No.: WO2023/149994
PCT Pub. Date: Aug. 10, 2023

(65) Prior Publication Data

US 2025/0048157 A1 Feb. 6, 2025

(30) Foreign Application Priority Data

Feb. 2, 2022 (GR) .............................. 20220100104

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0051* (2013.01); *H04W 72/0457* (2023.01); *H04W 72/51* (2023.01)

(58) Field of Classification Search
CPC . H04W 24/10; H04W 72/0457; H04W 72/51; H04W 8/24; H04W 64/00;
(Continued)

(56) References Cited

U.S. PATENT DOCUMENTS 12,413,989 B2 * 9/2025 Ren ........................ G01S 5/0205
12,604,304 B2 * 4/2026 Yang ................... H04W 72/046
(Continued)

FOREIGN PATENT DOCUMENTS

WO WO-2022260787 A1 * 12/2022 ............ H04W 64/00
WO WO-2023018464 A1 * 2/2023 .......... H04W 64/006
(Continued)

OTHER PUBLICATIONS

Fraunhofer Iis., et al., "DL-AoD Positioning Enhancements", 3GPP TSG RAN WG1 Meeting #105-e, R1-2105858, 3rd Generation Partnership Project (3GPP), Mobile Competence Centre, 650, Route Des Lucioles, F-06921, Sophia-Antipolis Cedex, France, vol. RAN WG1, No. e-Meeting; May 10, 2021-May 27, 2021, May 11, 2021, 5 Pages, XP052006469, Sections 1-3.
(Continued)

*Primary Examiner* — Faruk Hamza
(74) *Attorney, Agent, or Firm* — Polsinelli LLP

(57) ABSTRACT

Disclosed are systems, apparatuses, processes, and computer-readable media to determine a location of a device using carrier phase positioning. A process includes transmitting, at the device to a network entity, a phase measurement capability of a device (e.g., a user equipment (UE)) for subcarrier set pairs of different resources received by the device. The different resources are associated with a refer-
(Continued)

ence signal. The process can include receiving, at the device, a phase measurement request from a network entity for configuring phase measurements of the subcarrier set pairs of the different resources. The process can include transmitting a phase measurement report to the network entity based on the phase measurement request, the phase measurement report including information associated with a measured phase difference of at least one subcarrier set pair associated with the different resources.

25 Claims, 13 Drawing Sheets

(51) Int. Cl.
*H04W 72/0457* (2023.01)
*H04W 72/51* (2023.01)

(58) Field of Classification Search
CPC ............. H04L 5/0051; H04L 27/26025; H04L 5/0048; H04L 5/0069; H04L 5/0083; H04L 5/0091; H04L 27/2646; H04L 27/2657; H04L 27/2675; H04L 5/0032; H04L 5/001; H04B 17/24; H04B 17/27
See application file for complete search history.

(56) References Cited

U.S. PATENT DOCUMENTS

| | | | | |
|---|---|---|---|---|
| 2020/0212990 | A1* | 7/2020 | Kurras | H04L 5/0051 |
| 2021/0051622 | A1 | 2/2021 | Manolakos et al. | |
| 2021/0112541 | A1 | 4/2021 | Manolakos et al. | |
| 2021/0328737 | A1 | 10/2021 | Manolakos et al. | |
| 2023/0046045 | A1* | 2/2023 | Bao | H04W 64/006 |
| 2023/0090412 | A1* | 3/2023 | Rousseau | G01S 19/44 342/357.27 |
| 2023/0180172 | A1* | 6/2023 | Zhang | G01S 5/02 455/456.1 |
| 2023/0262646 | A1* | 8/2023 | Li | H04W 64/00 370/329 |
| 2024/0114378 | A1* | 4/2024 | Hwang | H04W 24/08 |
| 2024/0159855 | A1* | 5/2024 | Saini | G01S 5/0244 |
| 2024/0267184 | A1* | 8/2024 | Keating | G01S 13/84 |
| 2024/0319352 | A1* | 9/2024 | Peng | G01S 5/10 |
| 2024/0340843 | A1* | 10/2024 | Xiong | H04L 5/0012 |
| 2024/0381141 | A1* | 11/2024 | Bao | H04W 24/10 |
| 2024/0389062 | A1* | 11/2024 | Xie | H04W 4/02 |
| 2025/0048157 | A1* | 2/2025 | Manolakos | H04W 72/0457 |
| 2025/0113325 | A1* | 4/2025 | Hekkala | H04L 5/0051 |
| 2025/0227659 | A1* | 7/2025 | Saha | G01S 5/0036 |
| 2025/0301449 | A1* | 9/2025 | Shim | H04W 24/08 |
| 2026/0036688 | A1* | 2/2026 | Dwivedi | G01S 5/017 |
| 2026/0050087 | A1* | 2/2026 | Weinbach | G01S 19/072 |
| 2026/0067052 | A1* | 3/2026 | Manolakos | G01S 5/10 |
| 2026/0086191 | A1* | 3/2026 | Frank | G01S 5/10 |
| 2026/0104517 | A1* | 4/2026 | Peng | G01S 19/44 |

FOREIGN PATENT DOCUMENTS

| | | | | |
|---|---|---|---|---|
| WO | WO-2023149994 A2 * | 8/2023 | H04L 5/0051 |
| WO | WO-2023172807 A1 * | 9/2023 | G06F 7/582 |
| WO | WO-2024019515 A1 * | 1/2024 | H04L 5/0094 |
| WO | WO-2024019538 A1 * | 1/2024 | G01S 5/0009 |
| WO | WO-2024107502 A1 * | 5/2024 | H04W 24/10 |
| WO | WO-2024161244 A1 * | 8/2024 | H04L 5/0091 |
| WO | WO-2024235146 A1 * | 11/2024 | H04L 5/0051 |
| WO | WO-2025032562 A2 * | 2/2025 | G01S 5/0036 |
| WO | WO-2025093950 A1 * | 5/2025 | H04B 17/24 |
| WO | WO-2025193352 A1 * | 9/2025 | H04L 5/0051 |

OTHER PUBLICATIONS

Huawei, et al., "Enhancement for DL AoD Positioning", 3GPP TSG-RAN WG1 Meeting #106-e, R1-2106451, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 7, 2021, 15 Pages, XP052037779, Sections 2, 2.1, 2.2, 3, 4, 4.1.

Huawei, et al., "On Latency Reduction for Positioning Measurement", 3GPP TSG-RAN WG4 Meeting #101-bis-e, R4-2201638, 3rd Generation Partnership Project (3GPP), Mobile Competence Centre, 650, Route Des Lucioles, F-06921, Sophia-Antipolis Cedex, France, vol. RAN WG4, No. Electronic Meeting, Jan. 17, 2022-Jan. 25, 2022, Jan. 10, 2022, XP052092414, 19 pages, sections 2.1.2, 2.3.3, 2.4.2.

Huawei, et al., "Rel-17 UE Features for NR Positioning Enhancements", 3GPP TSG RAN WG1 Meeting #106bis-e, R1-2109147, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 11, 2021-Oct. 19, 2021, Oct. 2, 2021, XP052058107, 5 pages, sections 2, 3.1.2, 3.3, 3.4.1.

Intel Corporation: "Further Discussion on NR PRS RSTD Requirements", 3GPP TSG-RAN WG4 Meeting # 95-e, R4-2006556, 3rd Generation Partnership Project (3GPP), Mobile Competence Centre, 650, Route Des Lucioles, F-06921, Sophia-Antipolis Cedex, France, vol. RAN WG4, No. Electronic Meeting, May 25, 2020-Jun. 5, 2020, May 15, 2020, XP051883633, 18 pages, sections 3, 4.

Intel Corporation: "UE and gNB Measurements for NR Positioning", 3GPP TSG RAN WG1 Meeting #96bis, R1-1904321, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 3, 2019, pp. 1-9, XP051707191, Figure 1, Sections 2.1, 2.2, 2.4, 2.6.

International Search Report and Written Opinion—PCT/US2022/082080—ISA/EPO—May 30, 2023.

Khoryaev A., et al., "Status Report of WI: NR Positioning Support", 3GPP TSG RAN meeting #84, RP-191155, 3rd Generation Partnership Project (3GPP), Mobile Competence Centre, 650, Route Des Lucioles, F-06921, Sophia-Antipolis Cedex, France, vol. TSG RAN, No. Newport Beach, USA, Jun. 3, 2019-Jun. 6, 2019, Jun. 2, 2019, XP051747364, 19 pages, sections 2.1.1.1.1, 2.1.1.1.4, 2.1.1.2.3, 2.2.1.2, 2.3.1.1.

Partial International Search Report—PCT/US2022/082080—ISA/EPO—May 30, 2023.

Qualcomm Incorporated: "Potential Enhancements on DL-AoD Positioning", R1-2103172, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177972, pp. 1-12, sections 1-3, 6.1, 6.2.

VIVO: "Discussion on Potential Enhancements for DL-AoD Method", 3GPP TSG RAN WG1 #105-e, R1-2104361, 3rd Generation Partnership Project (3GPP), Mobile Competence Centre, 650, Route Des Lucioles, F-06921, Sophia-Antipolis Cedex, France, vol. RAN WG1, No. e-Meeting; May 10, 2021-May 27, 2021, May 11, 2021, 16 Pages, XP052006114, Sections 2.2, 3, 4, 5, 5.3, 6.

* cited by examiner

INTER-REFERENCE SIGNAL RESOURCE USAGE FOR CARRIER PHASE MEASUREMENTS

CROSS-REFERENCE TO RELATED APPLICATIONS

This application for patent is a 371 of international Patent Application PCT/US2022/082080, filed Dec. 20, 2022, which claims priority to Greek patent application No. 20220100104, filed Feb. 2, 2022, all of which are hereby incorporated by reference in their entirety and for all purposes.

FIELD

The present disclosure generally relates to carrier phase positioning. For example, aspects of the present disclosure relate to systems and techniques for using subcarriers in a wireless communication system for determining a position of a mobile device.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

Systems and techniques are described herein that provide reference signals for enhanced carrier phase measurements for carrier phase positioning with wireless communication systems. In one illustrative example, a process for wireless communications at a user equipment (UE) is provided. The process includes: transmitting, at the UE to a network entity, a phase measurement capability of the UE for subcarrier set pairs of different resources received by the UE, the different resources being associated with a reference signal; receiving, at the UE, a phase measurement request from a network entity for configuring phase measurements of the subcarrier set pairs of the different resources; and transmitting a phase measurement report to the network entity based on the phase measurement request, the phase measurement report including information associated with a measured phase difference of at least one subcarrier set pair associated with the different resources.

In another example an apparatus for wireless communications is provided that includes a memory (e.g., configured to store data, such as virtual content data, one or more images, etc.) and one or more processors (e.g., implemented in circuitry) coupled to the memory. The one or more processors are configured to and can: transmit, to a network entity, a phase measurement capability of the apparatus for subcarrier set pairs of different resources received by the apparatus, the different resources be associated with a reference signal; receive a phase measurement request from a network entity for configure phase measurements of the subcarrier set pairs of the different resources; and transmit a phase measurement report to the network entity based on the phase measurement request, the phase measurement report including information associated with a measured phase difference of at least one subcarrier set pair associated with the different resources.

In another example, a non-transitory computer-readable medium of a user equipment (UE) is provided that has stored thereon instructions that, when executed by one or more processors, cause the one or more processors to: transmit, to a network entity, a phase measurement capability of the UE for subcarrier set pairs of different resources received by the UE, the different resources be associated with a reference signal; receive a phase measurement request from a network entity for configure phase measurements of the subcarrier set pairs of the different resources; and transmit a phase measurement report to the network entity based on the phase measurement request, the phase measurement report including information associated with a measured phase difference of at least one subcarrier set pair associated with the different resources.

In another example, an apparatus for wireless communications is provided. The apparatus includes: means for transmitting, to a network entity, a phase measurement capability of the apparatus for subcarrier set pairs of different resources received by the apparatus, the different resources being associated with a reference signal; means for receiving a phase measurement request from a network entity for configuring phase measurements of the subcarrier set pairs of the different resources; means for transmitting a phase measurement report to the network entity based on the phase measurement request, the phase measurement report including information associated with a measured phase difference of at least one subcarrier set pair associated with the different resources.

According to another example, a process is provided for wireless communications at a network entity. The method includes: receiving, at the network entity from a user equipment (UE), a phase measurement capability of the UE for subcarrier set pairs of different resources received by the UE, the different resources being associated with a reference signal; transmitting, at the network entity to the UE, a phase measurement request from a network entity for configuring phase measurements of the subcarrier set pairs of the different resources; receiving, at the network entity from the UE, a phase measurement report to the network entity based on the phase measurement request, the phase measurement report including information associated with a measured phase difference of at least one subcarrier set pair associated with the different resources.

In another example, an apparatus for wireless communications is provided that includes a memory (e.g., configured to store data, such as virtual content data, one or more images, etc.) and one or more processors (e.g., implemented in circuitry) coupled to the memory. The one or more processors are configured to and can: receive, from a user equipment (UE), a phase measurement capability of the UE for subcarrier set pairs of different resources received by the UE, the different resources be associated with a reference signal; transmit, to the UE, a phase measurement request from a network entity for configure phase measurements of the subcarrier set pairs of the different resources; and receive, from the UE, a phase measurement report to the network entity based on the phase measurement request, the phase measurement report including information associated with a measured phase difference of at least one subcarrier set pair associated with the different resources.

In another example, a non-transitory computer-readable medium of a network entity is provided that has stored thereon instructions that, when executed by one or more processors, cause the one or more processors to: receive, from a user equipment (UE), a phase measurement capability of the UE for subcarrier set pairs of different resources received by the UE, the different resources be associated with a reference signal; transmit, to the UE, a phase measurement request from a network entity for configure phase measurements of the subcarrier set pairs of the different resources; and receive, from the UE, a phase measurement report to the network entity based on the phase measurement request, the phase measurement report including information associated with a measured phase difference of at least one subcarrier set pair associated with the different resources.

In another example, an apparatus for wireless communications is provided. The apparatus includes: means for receiving, from a user equipment (UE), a phase measurement capability of the UE for subcarrier set pairs of different resources received by the UE, the different resources being associated with a reference signal; means for transmitting, to the UE, a phase measurement request from a network entity for configuring phase measurements of the subcarrier set pairs of the different resources; and means for receiving, from the UE, a phase measurement report to the network entity based on the phase measurement request, the phase measurement report including information associated with a measured phase difference of at least one subcarrier set pair associated with the different resources.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
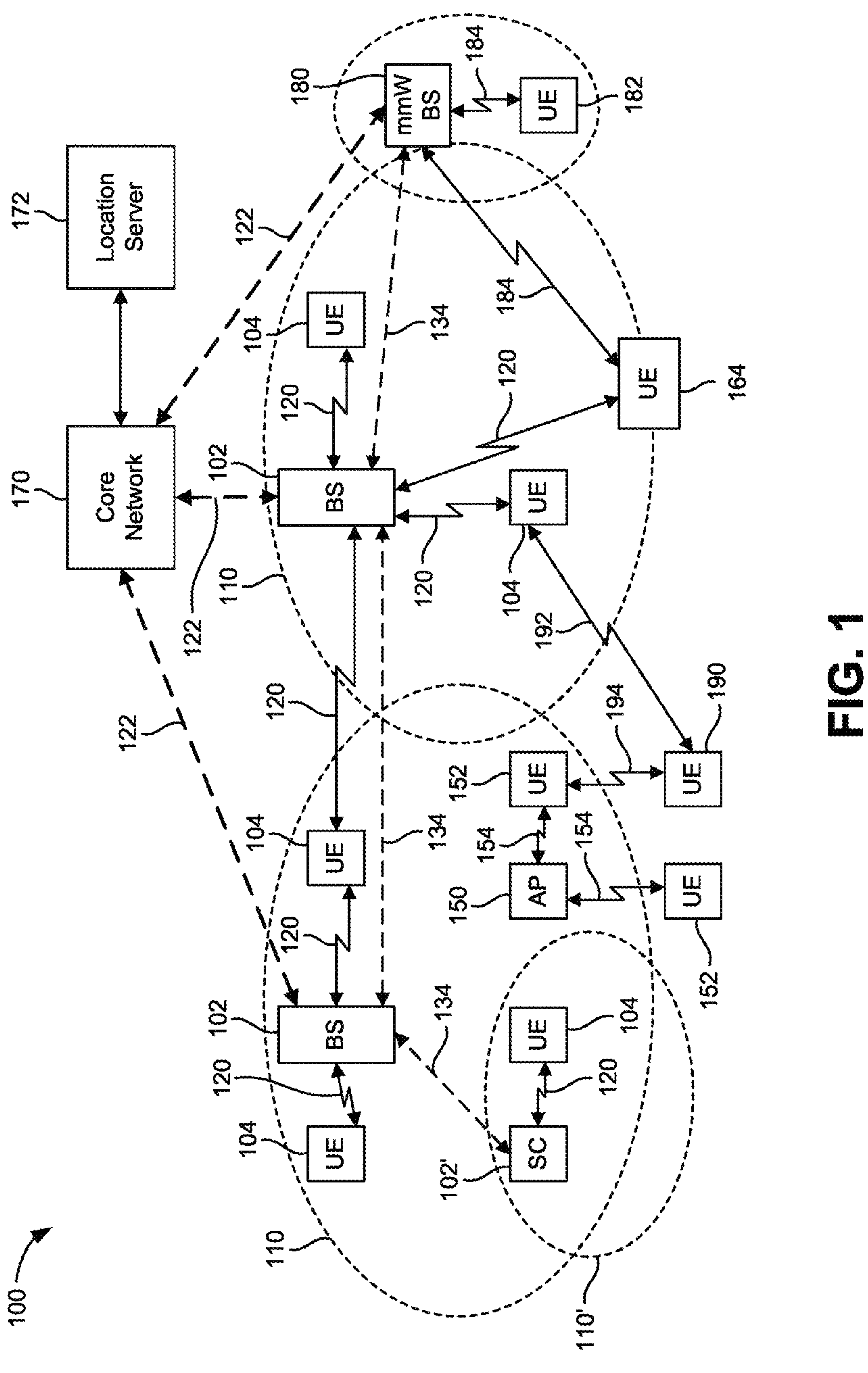
FIG. 1 is a diagram illustrating an example wireless communications system, in accordance with some aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The ensuing description provides example aspects only, and is not intended to limit the scope, applicability, or configuration of the disclosure. Rather, the ensuing description of the exemplary aspects will provide those skilled in the art with an enabling description for implementing an aspect of the disclosure. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As noted above, 5G mobile standard calls for higher data transfer speeds, greater numbers of connections, and better coverage, among other improvements. 5G is expected to support several hundreds of thousands of simultaneous connections. Consequently, there is room to improve the spectral efficiency of 5G mobile communications by enhancing signaling efficiencies and reducing latency. One aspect where such signaling efficiency and reduction in latency can be achieved is the communication of various uplink and downlink reference signals between user equipment and their respective serving base stations.

Reference signals are predefined signals occupying specific resource elements within a time-frequency grid of a resource block and may be exchanged on one or both of downlink and uplink physical communication channels. Each reference signal has been defined by the 3rd Generation Partnership Project (3GPP) for a specific purpose, such as for channel estimation, phase-noise compensation, acquiring downlink/uplink channel state information, time and frequency tracking, among others.

Example reference signals include, but are not limited to, Positioning Reference Signal (PRS), Sounding Reference Signal (SRS), Channel State Information-Reference Signal (CSI-RS), De-Modulation Reference Signal (DMRS), among others. Some reference signals (e.g., PRS, CSI-RS, etc.) are downlink specific signals, while others such as DMRS are sent both on downlink and uplink communication channels. There are also uplink specific reference signals defined by the 3GPP.

Reference signals may be used to determine location measurements using a carrier phase positioning based technique. For example, carrier phase positioning can include measuring the phase a received carrier or subcarrier signal (e.g., a subcarrier of a reference signal, such as a PRS), and using the phase to determine a distance from a transmitter of the signal to a receiver of the signal. In some cases, a phase measurement combination or "wide-laning" can be performed by determining phase differences between the received phases of a pair of subcarrier signals (where each pair of subcarriers can be referred to as a "lane") and mapping the phase difference to the distance between the transmitting device and the receiving device. In some cases, the phase differences can be determined by subtracting the received phases of the pair of subcarrier signals.

Systems, apparatuses, processes (also referred to as methods), and computer-readable media (collectively referred to herein as systems and techniques) are described herein for providing improved carrier phase positioning. In some implementations, determining distances between a transmitting device (e.g., a next generation Node B (gNB) or other network device or portion thereof) and a receiving device (e.g., a user equipment (UE)) based on phase measurements may require measurements of signals that have a large frequency differences, for example, to achieve a particular positioning accuracy (e.g., centimeter level accuracy). The systems and techniques described herein include techniques for combining different resources to increase the availability of phase measurements with the particular positioning accuracy (e.g., centimeter level accuracy). For example, a network entity (e.g., a location server such as a location management function (LMF), a base station, or portion thereof such as in a distributed architecture) and a device (e.g., a UE) may exchange information to provide the network entity with resource measurement capabilities of the device and to allow the device to combine different resources and thus increase availability of resources that are needed for carrier phase positioning with the desired positioning accuracy.

In some aspects, the device may transmit a message to the network entity reporting a resource management capability of the device, such as an ability of the device to determine phase differences between reference signal resources of the same reference signal resource sets (e.g., PRS resources of the same PRS resource sets), an ability of the device to determine phase differences between reference signal resources of different reference signal resource sets of a same signal source (e.g., PRS resources of different PRS resource sets of a same transmission-reception point (TRP)), an ability of the device to determine phase differences between reference signal resources of different reference signal resource sets of different signal sources (e.g., between PRS resources of different PRS resource sets of different TRPs), etc. In some cases, the network entity can receive the resource management capability of the device, and may use the resource management capability to identify and transmit resources available to the device that can be used for various phase measurements. In this illustrative example, the device can determine resources to measure and then measure the resources using the disclosed carrier phase measurement techniques. In some examples, by allowing the network entity to identify resources in different frequencies or different set of resources, the device can select the resources and to improve carrier phase measurement techniques.

Various other types of information can be exchanged between the device and the network entity to improve carrier positioning operations. In some examples, a network entity can identify measurements for the device to perform based on different qualities of the different resources. For example, the network entity can identify how the device should measure symbols across different resources and the device can identify symbols measured. In some examples, a TRP communicating with the device can provide information to the device to assist the device in selecting resources identified by the network entity. In some aspects, the systems and techniques can be combined with other positioning techniques to improve measurement latency and accuracy of positioning techniques by combining disparate types of measurements. This approach provides flexibility for the variety of environments for network entities and devices and enables carrier phase measurements in a variety of conditions such as indoor, outdoor, low power, high power, for example.

The systems and techniques described herein can be applied to communications between a network entity (e.g., a base station, location server, etc.) and a user device (e.g., a UE, a base station) or to communications between user devices (e.g., between UEs, vehicles, etc.) using sidelink communications (e.g., a cellular based PC5 sidelink interface, 802.11p defined Dedicated Short Range Communication (DSRC) interface, or other direct interface).

The systems and techniques described herein can improve user device (e.g., UE) location estimates or positioning based on the enhanced reference signals described herein. For instance, as noted above, the comb structures described herein can provide enhanced carrier phase measurements for carrier phase positioning. As used herein, a location estimate may be referred to by other names, such as a position estimate, location, location measurement, position, position fix, fix, or the like. A location estimate may be geodetic and may include coordinates (e.g., latitude, longitude, and possibly altitude) or may be civic and include a street address, postal address, or some other description of a location. A location estimate may further be defined relative to some other known location or defined in absolute terms (e.g., using latitude, longitude, and/or altitude). A location estimate may include an expected error or uncertainty (e.g., by including an area or volume within which the location is expected to be included with some specified or default level of confidence).

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a CU, a DU, an RU, a Near-RT RIC, or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHZ) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
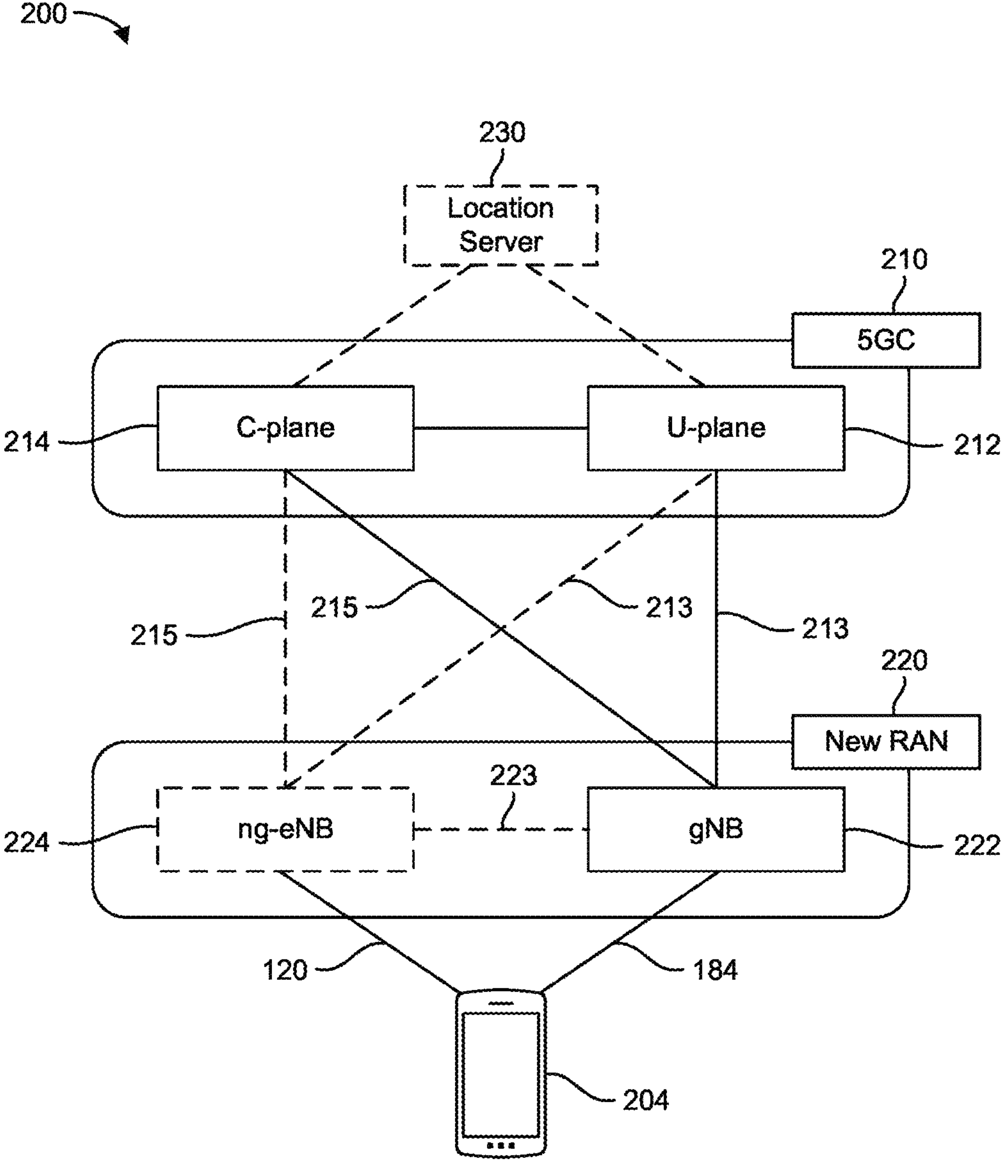
FIGS. 2A and 2B are diagrams illustrating example wireless network structures, in accordance with some aspects of the present disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
Figure 2B:
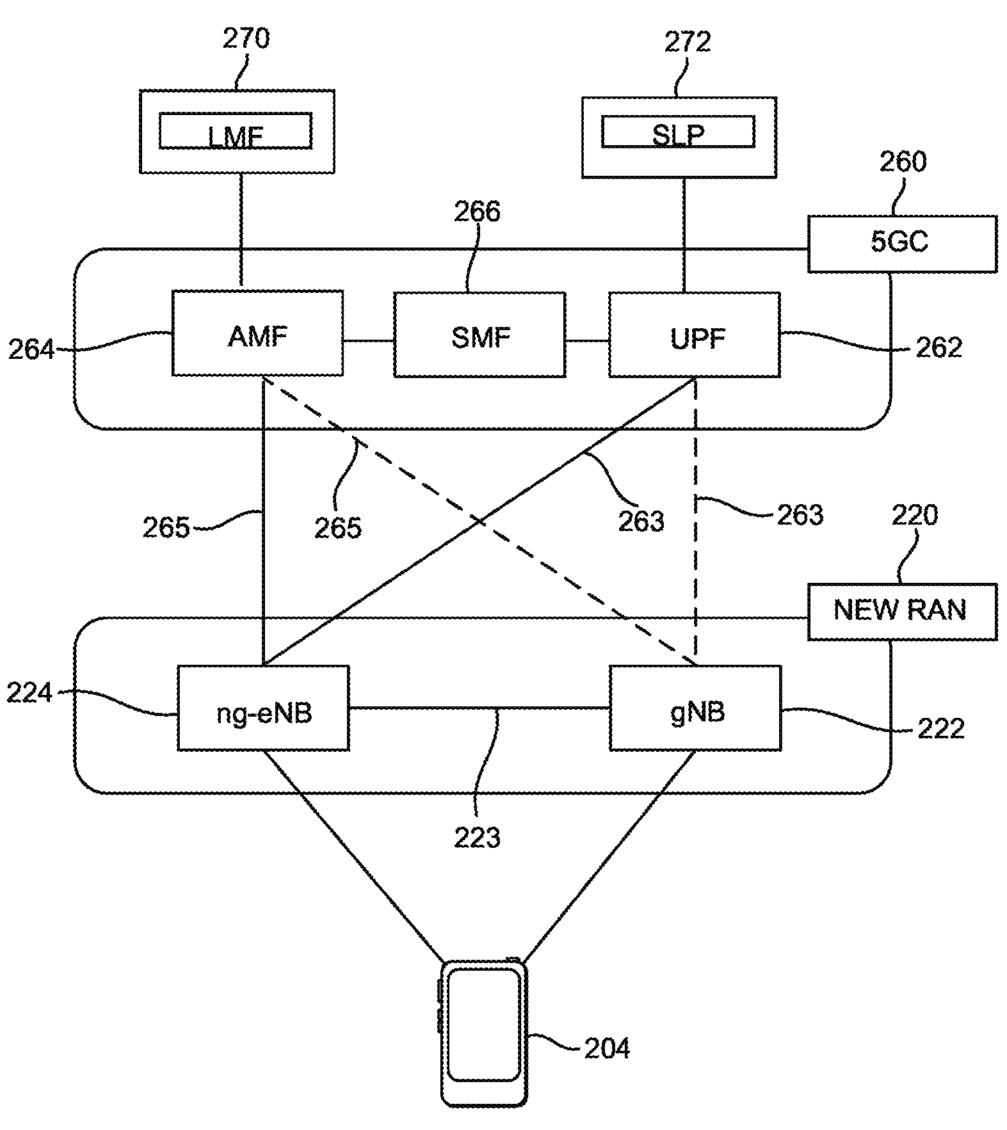

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The network nodes or network entities (e.g., base stations) of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and/or security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

In some aspects, location and positioning functions can be aided by a LMF 270 that is configured for communication with the 5GC 260, e.g., to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with a network node or entity (e.g., base station), such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a network node or entity (e.g., base station).

As discussed herein, NR supports a number of cellular network-based positioning technologies, including downlink-based, uplink-based, and downlink-and-uplink-based positioning methods. For example, the LMF 270 can enable positioning based on location measurements computed for various positioning signal (PRS or SRS) resources. As used herein, "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (e.g., identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu}\cdot\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

In some cases, a PRS resource ID in a PRS resource set is associated with a single beam (and/or beam ID) transmitted from a single TRP (where a TRP may transmit one or more beams). For example, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer" or "layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start physical resource block (PRB) (and center frequency), and the same comb size. The Point A parameter takes the value of the parameter ARFCN-ValueNR (where "ARFCN" stands for "absolute radio-frequency channel number") and is an identifier and/or code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one network node or entity (e.g., a base station, or a macro cell base station and a small cell base station) to transmit data channels, while frequency layers are used by several (usually three or more) a network nodes or entities (e.g., base stations) to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Downlink-based location measurements can include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of network nodes or entities (e.g., base stations), referred to as reference signal time difference (RSTD) or time difference of arrival (TDOA) measurements, and reports them to a positioning entity. More specifically, the UE receives the identifiers of a reference network node or entity (e.g., a serving base station) and multiple non-reference network nodes or entities (e.g., base stations) in assistance data. The UE then measures the RSTD between the reference network node or entity (e.g., reference base station) and each of the non-reference network nodes or entities (e.g., non-reference base stations). Based on the known locations of the involved network nodes/entities (e.g., base stations) and the RSTD measurements, the positioning entity (e.g., LMF 270) can estimate the UE's location. For DL-AoD positioning, a network node or entity (e.g., a base station such as gNB 222) measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a network node or entity (e.g., a base station) measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT or multi RTT"). In an RTT procedure, an initiator (a network node or entity, such as a base station, or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple network nodes or entities (e.g., base stations) to enable its location to be determined (e.g., using multilateration) based on the known locations of the a network nodes (e.g., base stations). RTT and multi-RTT methods can be combined with other positioning techniques, such as UL-AoA and DL-AoD, to improve location accuracy.

To assist positioning operations, a location server (e.g., location server 230, LMF 270, or other location server) may provide assistance data to the UE. For example, the assistance data may include identifiers of the network nodes or entities (e.g., base stations or the cells and/or TRPs of the base stations) from which to measure reference signals, the reference signal configuration parameters (e.g., the number of consecutive positioning subframes, periodicity of positioning subframes, muting sequence, frequency hopping sequence, reference signal ID, reference signal bandwidth, etc.), and/or other parameters applicable to the particular positioning method. Alternatively, the assistance data may originate directly from the network nodes or entities (e.g., base stations) themselves, such as in periodically broadcasted overhead messages, etc. In some cases, the UE may be able to detect neighbor network nodes itself without the use of assistance data.

For DL-AoD, the UE 204 can provide DL-PRS beam RSRP measurements to the LMF 270, whereas the gNB 222 can provide the beam azimuth and elevation angle information. When using an UL angle of arrival (AoA) positioning method, the position of UE 204 is estimated based on UL SRS AoA measurements taken at different TRPs (not illustrated). For example, TRPs can report AoA measurements directly to LMF 270. Using angle information (e.g., angle of departure (AoD) or AoA) together TRP co-coordinate information and beam configuration details, the LMF 270 can estimate a location of UE 204.

For multi-RTT location measurements, the LMF 270 can initiate a procedure whereby multiple TRPs (not illustrated) and a UE perform the gNB Rx-Tx and UE Rx-Tx measurements, respectively. For example, the gNB 222 and UE 204 can transmit a downlink positioning reference signal (DL-PRS) and uplink sounding reference signal (UL-SRS), respectively, whereby the gNB 222 configures UL-SRS to the UE 204 e.g., using the RRC protocol. In turn, the LMF 270 can provide the DL-PRS configuration to the UE 204. Resulting location measurements are reported to the LMF 270 by the UE 204 and/or gNB 222 to perform location estimation for the UE 204.

The 3rd Generation Partnership (3GPP) (e.g., Technical Specification (TS) TS22.261 and others) requires location measurements of devices (e.g., UEs) with sub-meter level performance. Conventional approaches to determining location measurements using terrestrial systems determine a distance using a "code-phase" or an RSTD measurement technique based on a ToA of the signal. In one example of an RSTD measurement, a UE receives signals from several neighboring eNBs and the ToA from each eNB are subtracted from the ToA of a reference eNB to yield an observed time difference of arrival (ODToA) of each neighboring eNBs. Each ODToA determines a hyperbola based on a known function, and a point at which the hyperbolas intersect corresponds to the location of the UE. At least three different timing measurements from geographically dispersed eNBs with good geometry are needed to solve for two coordinates (e.g., latitude and longitude) of the UE. RSTD measurements cannot satisfy the requirement of location measurement with sub-meter level performance due to timing errors and location errors that propagate into each ODToA measurement and reduce the accuracy of the location measurement.

A terrestrial-based system may implement an AoD method or a Zenith angle of departure (ZoD) method to provide better accuracy and resource utilization within a 3GPP system. There are contributions proposing the use of phase measurement for improving 5G/NR location measurements, however, the feasibility and performance of such proposals have not been sufficiently studied in 3GPP.

In some cases, phase measurement-based location measurements can be achieved using a non-terrestrial system, such as a Global Navigation Satellite System (GNSS), that employs carrier phase positioning techniques to provide centimeter-level accuracy. Carrier phase positioning can be performed by determining timing and/or distance measurements using a wavelength of a subcarrier signal. In contrast to RSTD measurement techniques, carrier phase positioning techniques estimate a phase of a subcarrier signal in the frequency domain.

One example of GNSS measurement techniques that provide sub-meter level performance use real-time kinematic positioning (RTK) to improve the accuracy of current satellite navigation (e.g., GNSS based) systems by configuring a network entity (e.g., a base station such as an eNB, a gNB, etc.) to measure the subcarrier signal and the network entity retransmits the measured phase of the carrier signal to a UE. The UE also measures the phase of the carrier signal from the satellite and compares the phase measurement at the UE and the phase measurement at the network entity to determine the distance of the mobile device from the network entity. While RTK positioning provides better accuracy over conventional GNSS measurement approaches, the accuracy is limited based on the accuracy of the network entity (e.g., the base station), line-of-sight to the satellite, and environmental conditions that can affect the measurements from the satellite system. For example, buildings can create reflections that increase phase error measured by the mobile device and cloudy conditions. RTK positioning is also limited to outdoor environments due to the receiver device requiring a line-of-sight to the satellites.

Bluetooth can also use carrier phase measurement for providing centimeter-level high accuracy positioning services but is limited to indoor environments due to the limited range of Bluetooth communication. Carrier phase measurement with Bluetooth may be inaccurate because the reference devices that transmit the carrier signals may not be fixed and inaccuracies in the location of the reference devices propagate into the carrier phase measurement.

Figure 3:
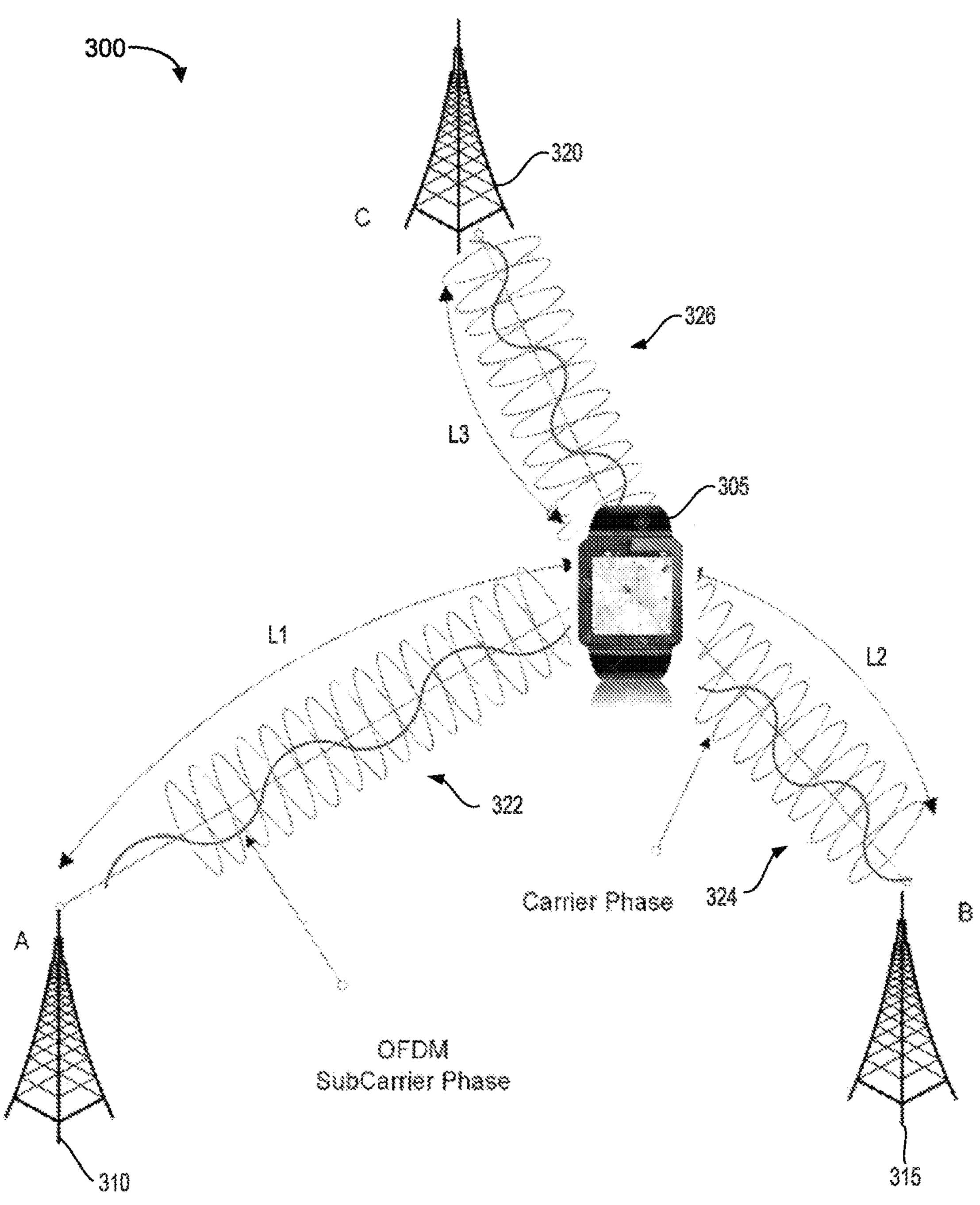
FIG. 3 is a diagram of a user equipment (UE) in a wireless communication system that determines a location based on distances from terrestrial transmitting devices, according to some aspects of the present disclosure.

FIG. 3 is a diagram of a UE 305 in a wireless communication system 300 that determines a location based on distances from terrestrial transmitting devices, according to some aspects of the present disclosure. Although FIG. 3 illustrates determining a location of the UE 305 in a wireless networking system relative to network entities 310, 315, and 320, this non-limiting illustration is for explanation purposes and the descriptions herein can be applied to other systems. In another illustrative example, the UE 305 may be a vehicle that employs vehicle-to-everything (V2X) communications with other vehicles or UEs to determine locations relative to other vehicles or objects to perform various driving functions such as lane assist, blind-spot detection, autonomous driving functions, and the like.

As shown in FIG. 3, the wireless communication system 300 includes the UE 305 positioned relative to a network entity 310, a network entity 315, and a network entity 320. In some cases, one or more of the network entities 310, 315, and 320 can be implemented in an aggregated or monolithic base station architecture or in a disaggregated base station architecture (e.g., including one or more of a CU, a DU, a RU, a Near-RT RIC, or a Non-RT RIC). Each of the network entities 310, 315, and 320 transmits a carrier signal that is received by the UE 305. In particular, the network entity 310 transmits the carrier signal 322, the network entity 315 transmits the carrier signal 324, and the network entity 320 transmits the carrier signal 326. In some aspects, the UE 305 can be configured to measure a distance L1 to network entity 310, a distance L2 to network entity 315, and a distance L3 to network entity 320. In one illustrative example, the UE 305 can determine its location based on the distances L1, L2, and L3 and the locations of each of the network entities 310, 315, and 320. In other examples, the UE can measure a parameter such as a carrier phase and transmit the measured parameter to another device, such as a location server (e.g., an LMF), that determines the location of the UE.

In some aspects, the wireless communication system 300 is a system configured to transmit using subcarriers across various frequencies. For instance, the wireless communication system 300 may be an orthogonal frequency division multiplexing (OFDM) system configured to transmit in a licensed frequency band or an unlicensed frequency band using subcarriers that are spaced across the frequency band.

Figure 4:
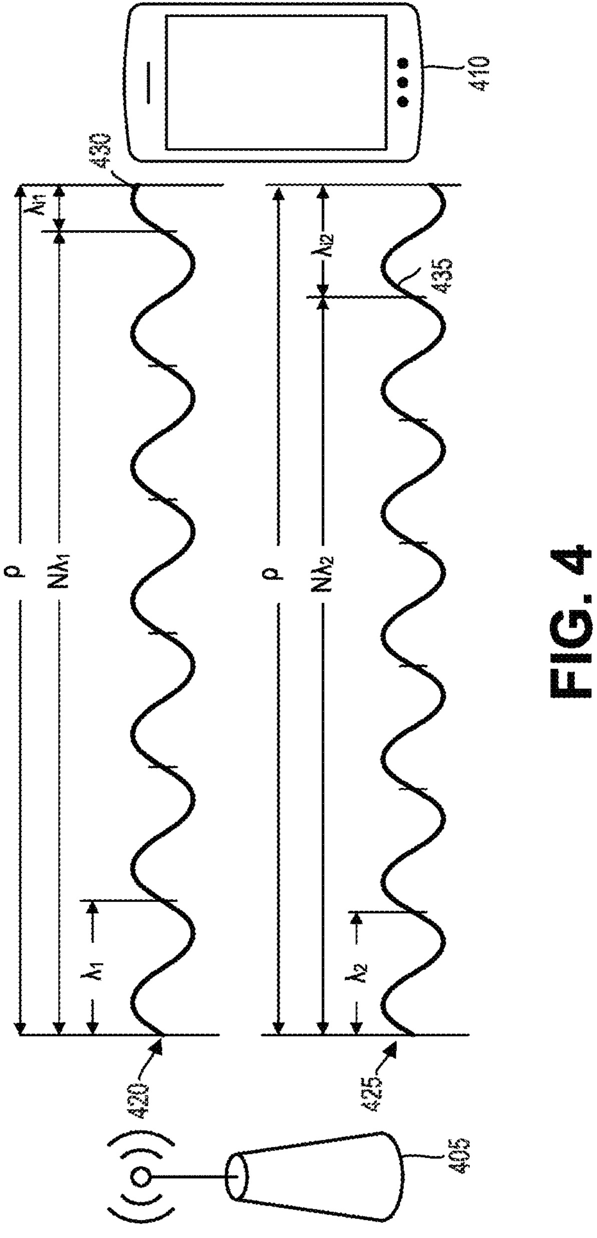
FIG. 4 in as illustration of a carrier phase measurement to determine a distance between a transmitting device and a receiving device based on a phase measurement combination, according to some aspects of the present disclosure.

FIG. 4 is an illustration of a transmitting device 405 communicating with a receiving device 410 via signal 420 and a signal 425. The signals 420 and 425 may be subcarrier signals. The transmitting device or the receiving device 410 may be configured to determine a carrier phase measurement that can be used to determine a distance between the transmitting device 405 and the receiving device 410 based on a phase measurement combination. In some aspects, the transmitting device 405 or the receiving device 410 can determine the carrier phase measurement and/or the distance. For instance, the receiving device 410 may determine the carrier phase measurement and may transmit the carrier phase measurement to the transmitting device 405. In another example, the receiving device 410 may determine the carrier phase measurement and may transmit the carrier phase measurement to another network entity, such as a location server (e.g., an LMF). The location server may receive the carrier phase measurement and determine the distance between the transmitting device 405 and the receiving device 410 using the carrier phase measurement. In some examples, the location server may receive distances between one or more other receiving devices and the transmitting device 405. The location server can use the distance determined for the receiving device 410 and the distances between one or more other receiving devices and the transmitting device 405 to determine a location of the receiving device 410 and/or the other receiving devices (e.g., by performing triangulation using the locations).

The signal 420 and the signal 425 are sinusoidal signals. The signal 420 has a wavelength denoted as $\lambda_1$ in FIG. 4 and the signal 422 has a wavelength denoted as 22. There are an integer number of wavelength cycles for each of the signals (e.g., subcarrier signals), including an integer number $N\lambda_1$ for the signal 420 and an integer number $N\lambda_2$ for the signal 425, as shown in FIG. 4. The receiving device 410 can measure the phase 430 of the signal 420 when the signal 420 is received and can measure the phase 435 of the signal 425 when the signal 425 is received. As shown, there is a fractional wavelength (shown as fractional wavelength Qui for the signal 420 and 22 for the signal 425) between the beginning of the last period or wavelength and when the signal is received by the receiving device 410. The receiving device 410 can perform carrier phase measurements by first determining the phase at which a signal is received (e.g., the phase 430 of the signal 420) and how many integer number (e.g., $N\lambda_1$ or $N\lambda_2$) of wavelengths have passed. For instance, the distance p between the transmitting device 405 and the receiving device 410 can be determined based on the integer number (e.g., $N\lambda_1$ or $N\lambda_2$) of wavelength cycles of a signal (e.g., the signal 420 and/or the signal 425) and the fractional wavelength (e.g., $\lambda_{i1}$ or $\lambda_{i2}$). In one illustrative example, if the wavelength λ1 is 10 centimeters (cm) and the integer number $N\lambda_1$ of wavelength cycles is 1000, then the distance ρ between the transmitting device 405 and a receiving device 410 can be determined as 10 meters (m) (based on 0.01 m×1000) plus a distance associated with the fractional wavelength $\lambda_{i1}$.

As noted above, the general concept of carrier phase measurements (e.g., for carrier/subcarrier-based positioning) is that any distance p between a transmitting device 405 (e.g., an eNB, a gNB, etc.) and a receiving device 410 (e.g., a UE) can be represented in terms of N full wavelengths λ and the residual fractional wavelength $\lambda_i$ of the subcarrier signal. In mathematical terms, the principle of estimating distance (ρ, also referred to as d) using a carrier phase can be given as follows:

$$\rho = N\lambda + \frac{\phi}{2\pi}\lambda \quad \text{(Equation 1)}$$

where NA is the integer number of wavelength cycles and $$\frac{\phi}{2\pi}\lambda$$

is the residual fractional wavelength $\lambda_i$ of the subcarrier signal (where the phase ϕ is divided by 2π if the phase is in radians). The wavelength λ of a signal can be determined based c/f, where c is the speed of light (299,792,458 meters per second) and f is the frequency of the signal. For example, a frequency of 3 GHz has a wavelength of 10 centimeters (cm) and a frequency of 500 kilohertz (kHz) has a wavelength of 600 meters. The fractional wavelength (e.g., $\lambda_{i1}$ in FIG. 4

$$\frac{\phi}{2\pi}\lambda$$

in Equation (1)) can be determined using a carrier phase measurement.

Measuring the phase ϕ of the received subcarrier signal will only provide the fractional wavelength $\lambda_i$ because the carrier phase is periodic. As noted above, the distance ρ between the transmitting device 405 and the receiving device 410 can be determined based on the integer number (e.g., $N\lambda_1$ or $N\lambda_2$) of wavelength cycles of a signal (e.g., the signal 420 and/or the signal 425) and a distance associated with the fractional wavelength (e.g., $\lambda_{i1}$ or $\lambda_{i2}$). However, typical carrier-phase measurements of a signal can only be used to determine the fractional phase term, as the term N is ambiguous (and cannot be directly measured) because the carrier phase is periodic. For example, a signal may be received by the receiving device 410 with a carrier phase of 0.5π (e.g.) 90°, or a length of 2.5 cm for a 3 GHz signal, but the signal may have traveled 2.5 cm, 12.5 cm, or 102.5 cm. The receiving device 410 receives the signal 420 with a fractional wavelength $\lambda_{i1}$ and receives the signal 425 with a fractional wavelength $\lambda_{i2}$ that is greater than fractional wavelength $\lambda_{i1}$ (e.g., based on the signal 425 having a higher frequency than the signal 420, based on being transmitted at different times, etc.). Therefore, an estimation or an inference is required (e.g., via different cycle count techniques) to determine N and thus to determine the distance ρ from the transmitting device 405 to the receiving device 410.

In some aspects, the number of integer cycles N can be inferred and an unknown distance to the receiving device 410 can be determined based on a carrier phase measurement using terrestrial transmitting devices (e.g., a gNB, a beacon, etc.). If the receiving device 410 receives and determines distances to at least two terrestrial transmitting devices that have a known location, the receiving device 410 may be able to determine the location of the receiving device 410 without non-terrestrial sources (e.g., satellites). As noted above, systems and techniques described herein can be used to determine an unknown distance between a transmitting device and a receiving device using carrier phase measurements from terrestrial devices in both indoor and outdoor environments. In some aspects, the systems and techniques disclosed herein can be applied to other non-terrestrial devices in a licensed band or an unlicensed band.

As noted above, the received phase $\phi_i$ of the $i^{th}$ carrier or subcarrier signal (e.g., the phase 430 of the signal 420 shown in FIG. 4) can be measured at the receiving device 410. In particular, the carrier phase can be determined based on Equation 2 below.

$$\phi_i = \frac{2\pi(\rho - N_i\lambda_i)}{\lambda_i} + e_{\phi_i} \quad \text{(Equation 2)}$$

In equation 2, $N_i$ is an ambiguous integer of wavelength cycles (as noted above), ρ is the distance between the transmitting device 405 and the receiving device 410, $\lambda_i$ is the wavelength of the $i^{th}$ carrier or subcarrier signal, and $e_{\phi_i}$ is the noise in the phase measurement. In some aspects, the received frequency domain resource elements (REs) of an OFDM-based reference signal (e.g., PRS, SRS, etc.) channel with a simple delay can be modeled by Equation 3 below:

$$R_k = D_k e^{-\frac{j2\pi k\Delta f\rho}{c}} + W_k \quad \text{(Equation 3)}$$

In Equation 3, k corresponds to a subcarrier according to the following:

$$k = -\frac{N_{RB}}{2}, \ldots, -1, 0, 1, \ldots, \frac{N_{RB}}{2},$$

where $N_{RB}$ is the number of resource blocks (RBs). The term k can be considered a subcarrier index that identifies a frequency of the signal. The term $R_k$ in Equation 3 above is the frequency domain RE transmitted on carrier k, $D_k$ is the time domain representation of the symbol transmitted on carrier k, and $W_k$ is the noise at the subcarrier k. Equation 3 can be further simplified into Equation 4 below.

$$R_k = D_k e^{-\frac{j2\pi k\rho}{\lambda_\Delta}} + W_k, \text{ where } \lambda_\Delta = \frac{c}{\Delta f} \quad \text{(Equation 4)}$$

In Equation 4, $\lambda_\Delta$ is the wavelength difference of two subcarrier frequencies. After a descrambling operation, the frequency domain PRS REs can be represented by Equations 5 and 6 below.

$$R'_k = \|D_k\|^2 e^{-\frac{j2\pi k\rho}{\lambda_\Delta}} + D_k^* W_k \quad \text{(Equation 5)}$$

$$R'_k = e^{-\frac{j2\pi k\rho}{\lambda_\Delta}} + W'_k \quad \text{(Equation 6)}$$

The carrier phase of a $k^{th}$ subcarrier can be determined based on the arctangent of the imaginary part of the frequency domain PRS RE divided by the real part of frequency domain PRS RE as identified in Equation 7 below.

$$\phi_k = -\tan^{-1}\left(\frac{\text{Im}\{R'_k\}}{\text{Re}\{R'_k\}}\right) = \frac{2\pi k\rho}{\lambda_\Delta} - 2\pi N_k \quad \text{(Equation 7)}$$

In this case, $N_k \Sigma \mathbb{Z}$ is an ambiguous number of full wavelength cycles that cannot be directly measured, and $\phi_k \in (-\pi, \pi)$ is the phase observation for the $k^{th}$ sub-carrier.

In some aspects, by combining the carrier phase measurements ϕ of different subcarriers, the measuring device (e.g., the transmitting device 405, the receiving device 410, or another network entity such as an LMF) may remove the ambiguity of the integer number of cycles N. For example, instead of directly mapping a phase (e.g., the phase 430 of signal 420) to a distance, as described above, a device can subtract the received phases of a pair of subcarrier signals (denoted as $\phi_k - \phi_{k-m}$ below) or a pair of set of subcarriers. A subcarrier set includes at least one subcarrier. One example of a "set of subcarriers" is a set with a single subcarrier. In such an example, a pair of subcarriers would be two subcarriers (as each set would include a single subcarrier). In some examples, "X subcarriers" (e.g., consecutive subcarriers) can be included in a set of subcarriers. In such examples, the measuring device can derive a single phase measurement for the set of subcarriers including X subcarriers. The measuring device can also derive a single phase measurement (e.g., an effective, average, median, or other representative phase of the set of subcarriers) for a second set of subcarriers including the same number (X) of subcarriers or a different number (e.g., Y) of subcarriers. Using the two phase measurements, the measuring device can determine the difference (e.g., $\phi_k - \phi_{k-m}$ as described below with respect to equation 8, where the $\phi_k$ is effective, average, median, or other representative phase of the set of subcarriers) between the two phase measurements. The terms subcarrier pair (or pair of subcarriers) and subcarrier set pair (or pair of set of subcarriers) will be used interchangeably herein.

In one illustrative example, for a pair of subcarriers x1, x2, the measuring device (e.g., UE) can derive two phases $\phi_1$, $\phi_2$. For a pair of set of subcarriers {x1a,x1b,x1c, . . . x1w}, {x2a,x2b,x2c, . . . x2w}, the measuring device can derive two phases as follows: $\phi_1$, $\phi_2$ where $\phi_1$ is derived based on {x1a,x1b,x1c, . . . x1w} and $\phi_2$ is derived based on {x2a,x2b,x2c, . . . x2w}. Further details regarding phase differences (e.g., $\phi_k - \phi_{k-m}$) are as described below with respect to equation 8.

Figure 5:
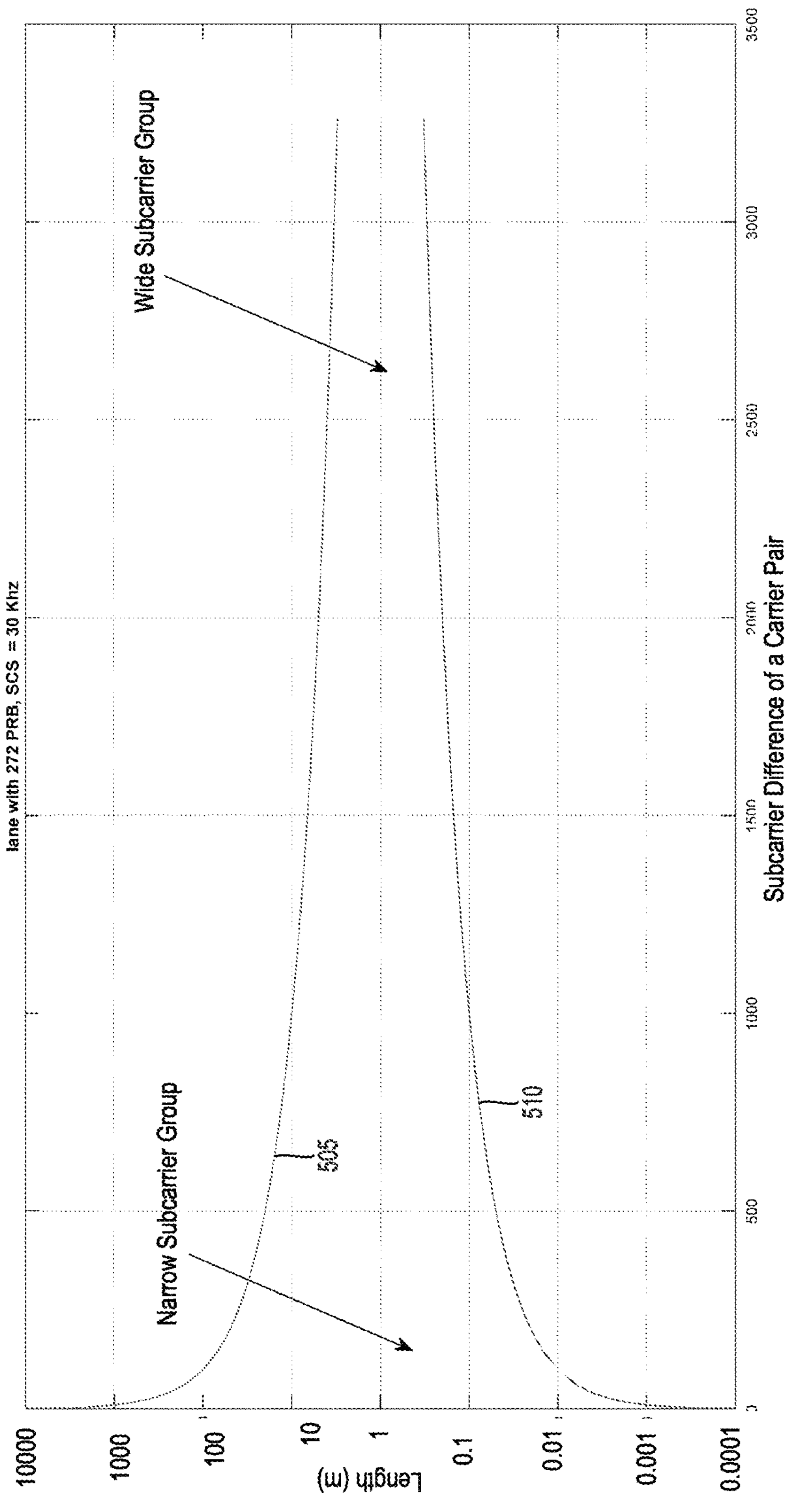
FIG. 5 is a graph that illustrates the equivalent distances of subcarrier pairs based on subcarrier spacing of an orthogonal frequency division multiplexing (OFDM) system, according to some aspects of the present disclosure.

For two subcarriers that are close together in the frequency domain, the wavelengths of the two subcarriers are close together, in which case the number of cycles of the subcarriers between a transmitting device (e.g., transmitting device 405) and a receiving device (e.g., receiving device 410) will be similar. Subtracting the respective phases of the two close-by subcarriers (denoted as $$\lambda_\Delta^m \Delta N_m$$

below) will thus result in the number N of wavelength cycles being canceled out or reduced to a negligible value, as shown by the equations below. As a result, as shown in Equation (11) below, the phase difference between the sub-carriers can map directly to the distance d between a transmitting device and a receiving device (e.g., transmitting device 405 and receiving device 410). Such a technique can thus be performed to determine a distance between a transmitting device and a receiving device even in view of the ambiguous number of cycles N. In some aspects, a pair of subcarriers (or pair of set of subcarriers) may be referred to as a "lane," and the operation of determining the distance from the transmitting device and the receiving device based on the difference in the phase measurements of a subcarrier pair (or subcarrier set pair) can be referred to as a phase measurement combination or "wide-laning". Examples of various subcarrier pairs/subcarrier set pair and corresponding wavelengths are illustrated in FIG. 5. Mathematical details of phase measurement combining (or wide-laning) using different subcarrier pairs are further detailed below with reference to descriptions related to Equations 8 to 10.

In some aspects, an OFDM system transmits across a licensed or unlicensed frequency band (e.g., 5 GHZ) that assigns each subcarrier a distinct center frequency with a fixed bandwidth, and the subcarriers are separated by a subcarrier spacing such as 30 KHz. A subcarrier is associated with a subcarrier index that identifies a distinct center frequency of each distinct subcarrier based on the subcarrier spacing. In some communication systems, subcarriers of a particular frequency band may also be separated by a guard interval to address potential interference from communication devices that are also communicating in that same frequency band. Equation 8 below illustrates how the carrier phase measurements of two different subcarriers, subcarrier k and subcarrier k-m with corresponding carrier phases denoted as Øk and Øk-m, can be combined based on the carrier phase measurement from Equation 7.

$$\phi_k - \phi_{k-m} = 2\pi d\frac{k}{\lambda_\Delta} - 2\pi N_k - 2\pi d\frac{k-m}{\lambda_\Delta} + 2\pi N_{k-m} \quad \text{(Equation 8)}$$

In some aspects, the number of cycles $N_k$ and $N_{k-m}$ may be equal or may be similar. The phase of the subcarrier pair (or subcarrier set pair), being separated by subcarrier difference m, can be compared to yield a phase measurement difference Δϕm (as illustrated in Equation 9 below), which can be used to determine a distance d from the transmitting device 405 and receiving device 410 (as illustrated in Equation 10 below).

$$\phi_k - \phi_{k-m} = \Delta\phi_m = \frac{2\pi d}{\frac{\lambda_\Delta}{m}} + 2\pi(N_{k-m} - N_k) = \frac{2\pi d}{\lambda_\Delta^m} + 2\pi\Delta N_m \quad \text{(Equation 9)}$$

Based on equation 9, the phase measurement difference Δϕm determined using Equation 9 can be used in Equation 10 below to determine a distance d from a transmitting device (e.g., transmitting device 405) to the receiving device (e.g., receiving device 410).

$$d = \lambda_\Delta^m \frac{\Delta\phi_m}{2\pi} + \lambda_\Delta^m \Delta N_m \quad \text{(Equation 10)}$$

where $$\lambda_\Delta^m$$

is the equivalent wavelength of a subcarrier combination with sub-carrier separation of mΔf, m is the subcarrier difference, and Δf is the spacing between subcarriers.

In one illustrative example, a first subcarrier of the subcarrier pair (or subcarrier set pair) has an index value of 1, corresponding to a subcarrier frequency of 5000.03 MHz, and a second subcarrier of the subcarrier pair (or subcarrier set pair) has an index value of 2, corresponding to subcarrier frequency of 5000.06 MHZ (e.g., a SCS of 30 kHz), with the subcarrier difference of 1. In this example, the subcarriers are spaced at 30 kHz intervals, and the equivalent wavelength $$\lambda_\Delta^1$$

of the subcarrier pair is based on $$\frac{c}{\Delta f} = \frac{299{,}792{,}458 \text{ m/s}}{(2-1)*30 \text{ kHz}},$$

or approximately 10 kilometers (km). The wavelengths of the subcarriers in this example are nearly equal based on the 30 KHz frequency difference. Because of the similar wavelength of the subcarrier frequencies, the subcarriers will need to travel a large distance before the number of cycles of the higher frequency subcarrier will increase and be different than the number of cycles of the lower frequency subcarrier.

In some aspects, a larger difference in frequencies between subcarrier pairs (or subcarrier set pair) will increase the difference in wavelengths ($\Delta N_m$) between the subcarriers in each subcarrier pair (or subcarrier set pair). However, the value of $\Delta N_m$ does not need to be zero, since the value of $\Delta N_m$ for each subcarrier pair can be known.

In some cases, there may be a maximum number of RBs that can be assigned to a particular signal (e.g., a PRS, SRS, DMRS, CSI-RS, etc.). For example, there may be a maximum of 272 RBs that are assignable to a PRS. In such an example, presuming a comb 1, symbol 1 RB structure with 12 assignable tones, there are 272×12=3264 different subcarrier assignments. Presuming that the largest subcarrier distance is used (e.g., the first subcarrier having an index of 1 and the last subcarrier having an index value of 3264), the two subcarriers of the subcarrier pair are separated by 3263 subcarriers, and the equivalent wavelength is $$\frac{299{,}792{,}458 \text{ m/s}}{3263 \times 30 \text{ kHz}} = 3 \text{ m}.$$

If the shortest subcarrier distance is used (e.g., the first subcarrier having an index of 1 and the next subcarrier having an index of 2), then the two subcarriers of the subcarrier pair are separated by 3263 subcarriers, and the equivalent wavelength is $$\frac{299{,}792{,}458 \text{ m/s}}{s \times 30 \text{ kHz}} = 9{,}931 \text{ m (or 10 km)}.$$

In some aspects, there are more subcarrier pairs with a larger equivalent wavelength than subcarrier pairs with a shorter equivalent wavelength. For example, there is a single subcarrier pair combination that yields a subcarrier distance of 3263 (e.g., subcarrier pair [1, 3264]), and there are at 3263 subcarrier pairs having a subcarrier spacing of 1 (e.g., [1, 2], [2, 3], [3, 4], . . . , [3263, 3264]). In some aspects, a narrow subcarrier pair (corresponding to a wide lane) refers to subcarriers that are relatively close together in frequency and have similar wavelengths, and a wide subcarrier pair (corresponding to a narrow lane) refers to subcarriers that are farther apart in frequency and have less similar wavelengths as compared to the narrow subcarrier pairs, which is illustrated herein with reference to FIG. 5.

Different subcarrier combinations may be used to identify an unknown location of a device because a narrow subcarrier pair or a wide subcarrier pair will not be able to produce accurate initial results for every case. For example, a narrow subcarrier group may be inaccurate because the receiving device may be close to the transmitting device (e.g., 200 m), in which case the phase differences of the narrow subcarrier pair may be outside of a measurement sensitivity of a phase measurement device on the receiving device and the measured phase will be dominated by noise (e.g., $e_{\Phi_i}$). In the case that phase of each subcarrier measurement is below the noise floor of the measurement (e.g., $e_{\Phi_i}$) and the difference in the subcarrier phase is zero, the measured phase yields a distance of zero from the transmitting device to the receiving device. In some aspects, a zero distance indicates that the transmitting device and the receiving device occupy the same physical space, which is not possible. In this case, the narrowest subcarrier group cannot be used to determine the distance between transmitting device 405 and the receiving device 410. The widest subcarrier group also cannot determine the distance between transmitting device 405 and the receiving device 410 because the receiving device 410 is outside of the smallest equivalent wavelength of 3 m and there are an ambiguous number of cycles N.

In some aspects, the wide subcarrier pair can be used if an initial location is known and the number of cycles can be determined. For example, if a location of a receiving device is known within a 3 meter radius, the widest subcarrier pair identified (e.g., subcarrier pair [1, 3264]) above can be used to identify a location in units of centimeters within that 3 meter radius. In some aspects, narrow subcarrier pairs can be used to identify a coarse location within larger areas but with lower accuracy, and then different subcarrier pairs can be used to identify a location within a smaller area but with higher accuracy.

FIG. 5 is a graph that illustrates the wavelengths of subcarrier pairs based on subcarrier spacing of an OFDM system and wavelength differences of the subcarrier pairs, according to some aspects of the present disclosure. In FIG. 5, the equivalent wavelength of the subcarrier pairs are illustrated by reference numeral 505 and the wavelength differences are illustrated by reference numeral 510. As described above, narrower subcarrier pairs have large equivalent wavelengths based on the wavelength of their subcarriers being closer than wider subcarrier pairs.

In some aspects, to address multipath fading, the time domain signal may need additional processing to remove earlier or later multipath signals. An inverse fast Fourier transform (IFFT) may determine that the PRS tone has some multipath components and the tone is converted back into the time domain and a time domain window function is applied to remove earlier or later received multipath signals. After the window function, the time domain representation of the tone is converted back into the frequency domain. In some aspects, techniques to reduce the effects of multipath fading may be expensive due to conversion into the time domain and then conversion back into the frequency domain.

Figure 6:
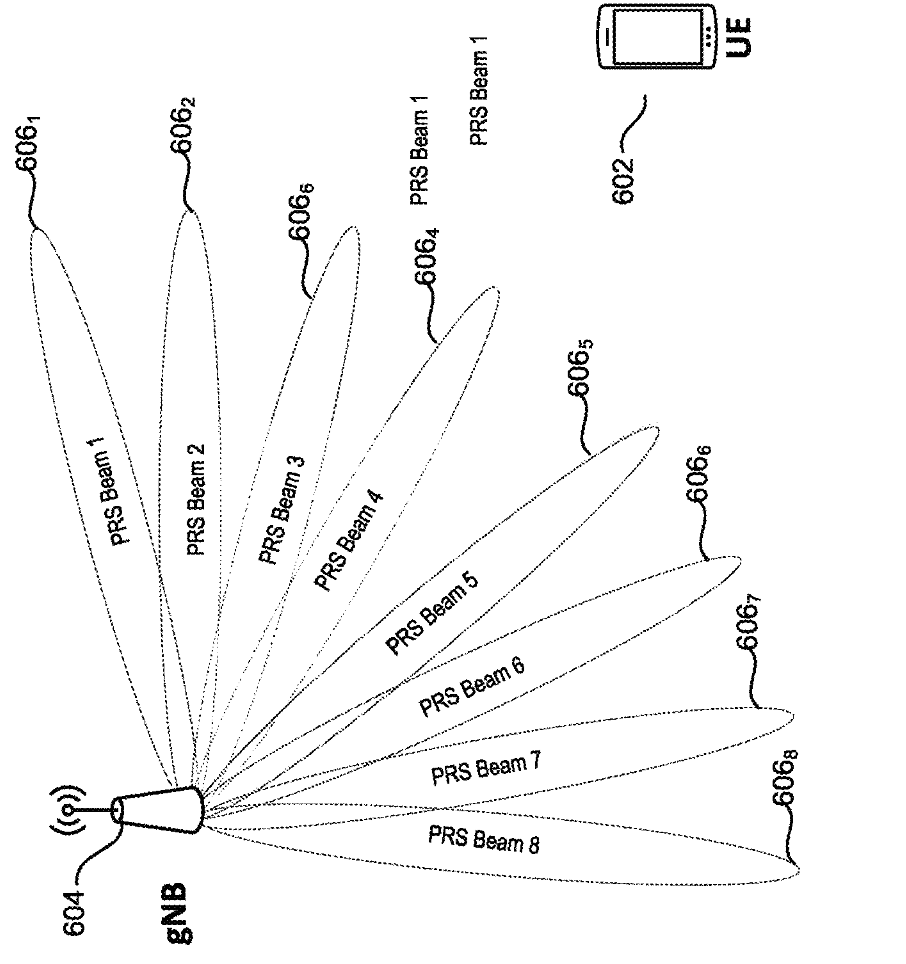
FIG. 6 is a communication diagram illustrating an example of the communication of positioning reference signal (PRS) resource sets between a next generation NodeB (gNB) and a UE device, according to some aspects of the present disclosure.

To improve the accuracy of UE location estimates, NR can support the combination of multiple different location measurement types. As illustrated in FIG. 6, a UE device 602 can determine its capability to process a PRS resource (e.g., to measure location or position data) in a PRS system 600. The UE device 602 can then provide its capabilities to a base station 604 (shown as a gNB) or location server (e.g., LMF, not illustrated) in a capability update (e.g., a message including the capability update) that can be used to determine which PRS resources are to be utilized for performing location or position measurements (e.g., to determine a location of the UE device 602). Thereafter, the UE device 602 can receive assistance data (AD) from the base station 604 or location server and perform PRS measurements based on the assistance data. However, in some cases the amount of assistance data (e.g., the number of PRS resources indicated by the assistance data) can be significantly greater than the capabilities of the UE device 602.

For example, the UE device 602 may only be capable of processing 5 PRS resources of the available PRS resources, yet the PRS assistance data may provide 20 PRS resources to the UE device 602 (including available PRS resources 6061, 6062, 6063, 6064, 6065, 6066, 6067, 6068). In this example, the UE device 602 may select a subset of PRS resources, such as 5 PRS resources, out of the 20 PRS resources with which to perform location or position measurements. In some cases, the UE may select the PRS resources based on a default order corresponding with the manner in which the resources are provided by the assistance data. For example, the UE can operate in a manner that assumes that the PRS resources are provided (e.g., in the AD) in a decreasing order of measurement priority. By way of example, within a positioning frequency layer, the DL PRS resources can be sorted in the AD in a decreasing priority order of measurement to be performed by the UE device 602, with a reference indicated by nr-DL-PRS-ReferenceInfo being the highest priority for measurement. Priorities can include up to 64 dl-PRS-IDs of the positioning frequency layer being sorted according to priority, or up to 2 DL PRS resource sets per dl-PRS-ID of the positioning frequency layer being sorted according to priority. In such cases, when the initially selected PRS resource cannot be utilized for PRS measurement purposes, the UE device 602 proceeds to the next PRS resource in an order of decreasing measurement priority.

In some aspects, NR can support different positioning frequency layer (PFL), which is a collection of one or more PRS resource sets across one or more TRPs that have the same values for certain parameters and a different frequency band. Specifically, a PFL can include collection of PRS resource sets and has the same SCS and CP type, the same value of the downlink PRS bandwidth, the same start PRB, and the same comb size. Currently, the UE device 602 is configured to only monitor a single resource set of a single PFL for existing positioning techniques. However, in some cases, a single PRS resource set of a single PFL may not be optimal for performing carrier phase positioning with centimeter level accuracy.

Aspects of the disclosed technology address the foregoing limitations by providing solutions for improving frequency resource by combining different resources to increase subcarriers that a device can measure, thereby increasing the number of subcarrier pair combinations (or subcarrier set pair combinations) available to the device. As noted in detail above, a single resource set can support only a single subcarrier pair (or subcarrier set pair) for measurements of the highest accuracy (e.g., a subcarrier pair having a subcarrier difference of 3263) and increasing the number of resources available to the device will increase the number of subcarrier pairs available for higher levels of accuracy.

Various systems and techniques are described herein for phase-based measurements in carrier phase positioning using multiple resources. In some aspects, a device (e.g., a UE, a gNB) can report (e.g., via signaling in one or more messages to a network entity device, such as an LMF, gNB, etc.) the number of different resources (e.g., the frequency resource sets, frequency layers) that the device can measure in a given period of time. Such measurement capability can be referred to as resource capability. For example, in some cases, a UE can observe a maximum of 5 different resource sets within frequency band FR1 and 4 different resource sets within frequency band FR2.

In some cases, a UE may be configured or requested (e.g., based on signaling transmitted by the network entity device, such as the LMF, gNB, etc., and received by the UE, which may include a phase measurement request) to provide a resource measurement capability. In some aspects, the resource measurement capability identifies capabilities of a UE to measure different resources. Non-limiting examples of different resources includes different PRS resource sets, different PFLs, and different types of reference signals. In some aspects, the UE can individually measure the phase (e.g., $\Delta\phi$ measurement) on each available symbol in a symbol pattern (e.g., a comb structure). In some examples, a UE can be configured or requested (e.g., based on signaling transmitted by the network entity device, such as the LMF, gNB, etc., and received by the UE) to report the best phase measurement (e.g., $\Delta\phi$ measurement, another measurement such as highest SINR, symbols that include a line of sight (LOS) component to prevent multipath effects, etc.) among the symbol measurements made on the available symbols (e.g., 4 symbol measurements in the comb-4/4-symbol pattern). In some examples, the UE can be configured or requested (e.g., based on signaling transmitted by the network entity device, such as the LMF, gNB, etc., and received by the UE) to report a representative phase measurement (e.g., the average, median, or other representative phase measurement, such as average, median, etc. $\Delta\phi$ measurement) of the symbol measurements made on the available symbols (e.g., 4 symbol measurements in the comb-4/4-symbol pattern).

In some examples, the UE can be configured or requested (e.g., based on signaling transmitted by the network entity device, such as the LMF, gNB, etc., and received by the UE) to report a particular maximum number of phase measurements (e.g., $\Delta\phi$ measurements) within a reference signal resource (e.g., PRS resource, SRS resource, DMRS resource, CSI-RS resource, etc.). In one illustrative example, for a comb-4/12-symbol resource (e.g., PRS resource, SRS resource, DMRS resource, CSI-RS resource, etc.), a network entity device such as the LMF, gNB, etc. may configure a group of reference signal symbols (e.g., PRS symbols, SRS symbols, DMRS symbols, CSI-RS symbols, etc.) which the UE is expected to use to derive a single phase measurement (e.g., $\Delta\phi$ measurement).

In some cases, the network entity device (e.g., the LMF, gNB, etc.) can configure the UE to report multiple measurements on each of the reference signal resources (e.g., each of the PRS resources, each of the SRS resources, each of the DMRS resources, each of the CSI-RS resources, any combination thereof, etc.). In some cases, the UE can consider each symbol measurement as a separate measurement and can report this to the network entity device (e.g., the LMF, gNB, etc.).

Additionally or alternatively, in some aspects, systems and techniques are described that provide a timestamp at the symbol level. For example, there may be a need or it may be desired to provide a phase measurement report of each symbol, such as in the case of a multiple symbol reference signal (e.g., PRS, SRS, DMRS, CSI-RS, etc.) configuration (e.g., comb-2/2-symbol, comb-4/4-symbol, etc.). Currently, an NR-TimeStamp-r16 message defines only at the slot level as shown below.

The systems and techniques described herein provide a timestamp on a symbol level for the UE to report a phase measurement (e.g., $\Delta\phi$ measurement) for each symbol of a reference signal resource (e.g., a PRS resource, an SRS resource, a DMRS resource, a CSI-RS resource, etc.). In some cases, a new information element (IE) (e.g., an optional IE) can be added into the NR-TimeStamp message to provide the timestamp at the symbol level. In one illustrative example, the new IE can be denoted as nr-symb-r18 and can be inserted before or after the nr-Slot-r16 IE.

Additionally or alternatively, in some aspects, systems and techniques are described that are related to inter-positioning frequency layer (inter-PFL) carrier phase measurements. In one example, a UE can be configured to perform wide/narrow lane determinations within reference signal resources (e.g., PRS resources, SRS resources, DMRS resources, CSI-RS resources, etc.) of different positioning frequency layers (PFLs). Such an example can help a carrier aggregation framework already (e.g., as defined in Release 16 and/or Release 17 of 3GPP) to improve the carrier phase positioning techniques. In another illustrative example, a UE can be configured to measure multiple narrow bands PFLs simultaneously. For instance, the UE can indicate to a network entity device (e.g., the LMF, gNB, etc.) the maximum PFL bandwidth the UE is configured to measure. In some cases, the UE can signal the maximum PFL bandwidth that it can measure in a capability information message (e.g., as an IE). The network entity device (e.g., LMF) can use the indicated capability to allocate multiple narrow band PFLs within the maximum PFL bandwidth supported. Such an example can be useful for the measurement gap needed for reference signal (e.g., PRS, SRS, etc.) processing. In another illustrative example, the UE can be configured with a capability of how many PFLs can be simultaneously processed, and can signal the number of simultaneously==PFLs it can process (e.g., in an IE of a capability information message) to the network entity (e.g., LMF, gNB, etc.). In some cases, each PFL will be equal to or less than the maximum bandwidth.

In another example, the network entity device (e.g., the LMF, gNB, etc.) can (and shall in some cases) provide signaling to the UE, indicating the PFLs can be measured simultaneously. In current 3GPP specifications, the UE is only measuring one PFL at any given time. In another example, a network entity device (e.g., the LMF, gNB, etc.) can ensure that all of the narrow PFLs which need to be combined for carrier phase positioning techniques are transmitted at the same time. In another example, a network entity device (e.g., the LMF, gNB, etc.) can ensure each narrow band PFL will have the phase continuity. For instance, the same TRP (e.g., of a gNB) can perform narrow band frequency hopping. In another example, the network entity device (e.g., the LMF, gNB, etc.) may provide signaling to the UE, indicating for the UE to perform carrier phase measurement across different PFLs. Such an example can include transmission phase correction performed by the network entity device (e.g., the LMF, gNB, etc.). Similar signaling can be used for phase measurements across TRPs and reference signal (e.g., PRS, SRS, etc.) recourses sets. In another example, the reference signal (e.g., PRS, SRS, etc.) resources or resource sets that can be lane-combined should are quasi-colocated (QCLed). In some cases, a new QCL-type (or generally association-type) can defined and configured and/or signaled to the UE. In one example, two resources are associated by being phase-aligned or have a fixed phase difference (within a configured/pre-determined margin).

Aspects are now described with respect to resource and processing capabilities. In some aspects, a carrier phase positioning technique can have separate characteristics than other positioning methods, such as NR-downlink angle of departure (NR-DL-AOD), NR-Multi-roundtrip time (RTT), or other positioning methods. For instance, each positioning method or technique can have its own configuration for measurement and/or reporting (e.g., measurement and/or reporting granularity or resolution), such as how phase measurements will be reported along with the other positioning method (e.g., AOD, RTT, etc.). In one example, a network entity device (e.g., as an LMF, gNB, etc.) can request that the UE perform carrier phase positioning using different resources for a carrier phase positioning technique (e.g., multiple PRS resource sets, multiple PFLs). The UE can then report to the network entity the angle of departure (AOD) measurements and carrier phase measurements.

In some aspects, a carrier phase positioning technique can have its own reference signal (e.g., PRS, SRS, DMRS, CSI-RS, etc.) processing capabilities. For instance, one difference of carrier phase positioning processing is that different PRS resources sets can be measured and different PFLs can be measured due to limitations in using a single resource. Other NR positioning techniques (e.g., NR-DL-TDOA, NR-DL-AOD, NR-Multi-RTT, etc.). In one example, a UE can signal (e.g., via one or more messages to a network entity) an indication of how many additional paths (e.g., including Earliest arrival path (EAP)) the UE can report. In another example, such as when the UE is only reporting the EAP path, the UE can report different sets of processing capabilities and resource capabilities. In another example, such as when the UE is reporting more than one path (e.g., EAP and additional path measurements), the UE can report the different set of processing capabilities and resource capabilities. In some cases, the carrier phase positioning method processing and resource capability of the UE may depend on the detection and report of the additional path measurement report.

Figure 7:
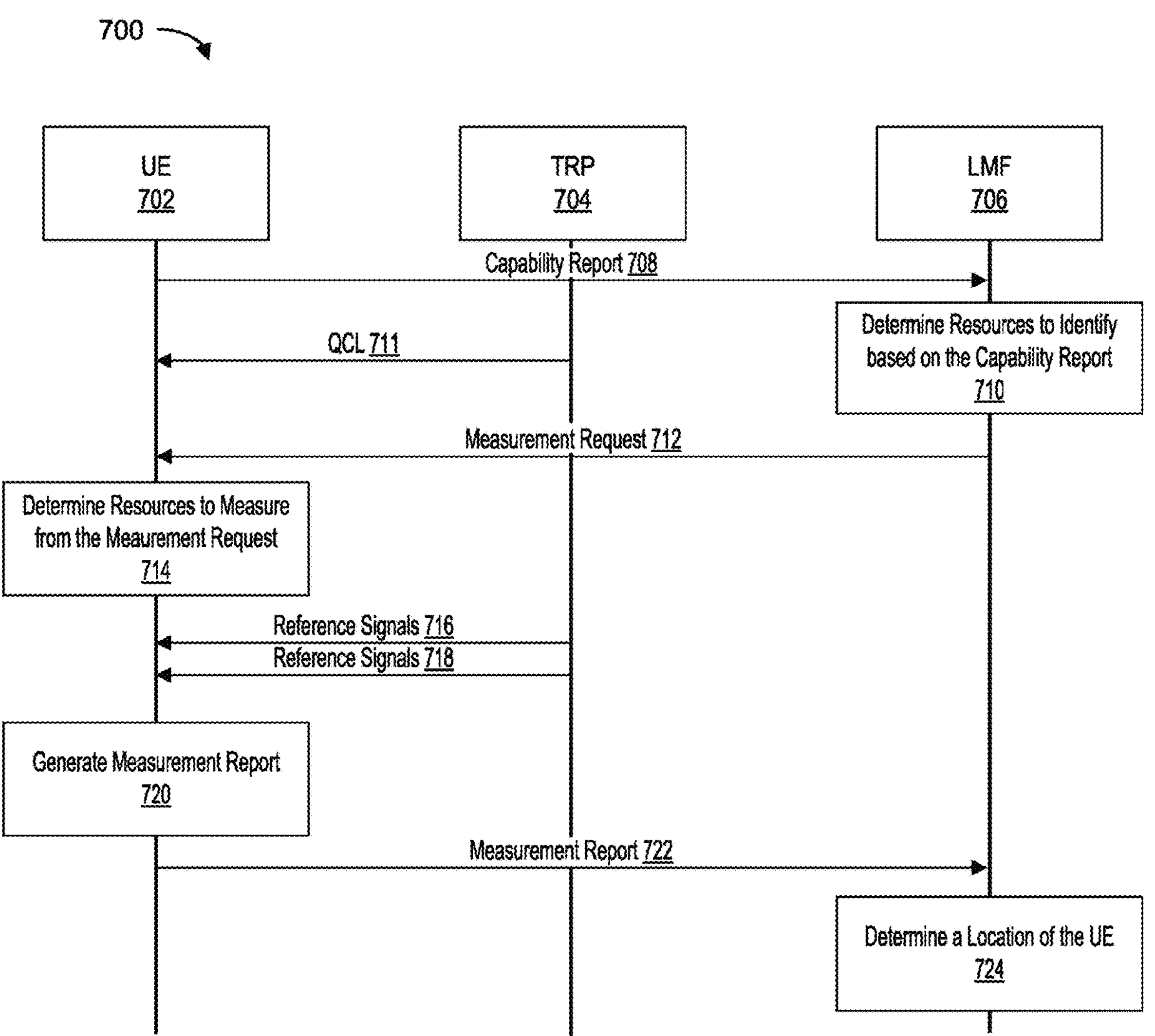
FIG. 7 is a sequence diagram of a process for configuring multiple resources for measurement in a wireless communication system, according to some aspects.

FIG. 7 is a sequence diagram of a process for configuring multiple resources for measurement in a wireless communication system 700, according to some aspects. In some aspects, the wireless communication system includes a UE 702, a TRP 704 configured to transmit reference signals for the UE 702, and an LMF 706 for determining a position or a location of the UE 702. In some examples, the UE 702 may know the characteristics of the reference signal and can compare the received signal with the known characteristics to determine various information such as path loss, time, etc. Non-limiting examples of reference signals that the TRP 704 can transmit and the UE 702 can measure include PRS, TRS, PTRS, CRS, DMRS, CSI-RS, SRS, PSS, SSS, and SSB.

In some aspects, the UE 702 can transmit a resource capability report 708 to a network entity such as the LMF 706 that includes information related to the UE measurement capabilities. For example, the resource capability report 708 can include information related to position measurement techniques such as identification of a resource processing capacity (e.g., a maximum number of PRS resource sets), a frequency layer capacity (e.g., a maximum number of frequency layers the UE is capable of concurrently processing), and other bandwidth information such as maximum supported bandwidth capability for a frequency band. In one illustrative example, the different RF components can process the different parts of a frequency band (e.g., different low noise amplifiers) and the resource capability report 708 can identify relevant information to improve identification of frequency assets for the UE 702. An example resource capability report 708 is illustrated in Table 1 and identifies various parameters of a downlink measurement capability report and a corresponding type of data for that parameter.

TABLE 1

```
{
NR-DL-MeasCapability ::= SEQUENCE {
   ue-SSID-r16                        NR-UE-SSID (0..255),
   nr-PhysCellID-r16                  NR-PhysCellID-r16             OPTIONAL,
   nr-CellGlobalID-r16                NCGI-r15                      OPTIONAL,
   nr-ARFCN-r16                       ARFCN-ValueNR-r15             OPTIONAL,
   nr-DL-PRS-ResourceID-r16           NR-DL-PRS-ResourceID-r16      OPTIONAL,
   nr-DL-PRS-ResourceSetID-r16        NR-DL-PRS-ResourceSetID-r16   OPTIONAL,
   nr-TimeStamp-r16                   NR-TimeStamp-r16,
   ue-PflMeasurementBitmap            INTEGER (0..255),
   ue-PflMeasurementCapability        INTEGER (0..7),
   ue-PrsMeasurementCapability        Integer (0..7),
   ue-RfProcessorBitmap               NR-ProcessorBitmap,
   ue-PhaseMeasurementCapability      INTEGER (0..16)
   ue-PhaseIfftWindowSize             INTEGER (0..4)
   ue-PhaseNoiseFloor                 INTEGER (0..16)
   nr-TimingQuality-r16               NR-TimingQuality-r16,
   nr-DL-PRS-RSRP-Result-r16          INTEGER (0..126)              OPTIONAL,
   nr-DL-TDOA-AdditionalMeas          NR-DL-TDOA-AdditionalMeasurements-r16
   ...
}
```

According to an illustrative example, the resource capability report 708 may include a PFL measurement bitmap that can be used to identify different bandwidths that the UE 702 is capable of measuring (from 4000 to 6000 MHz in FR1 and 6000 MHz to 7000 MHz in FR4) and a maximum number of PFL measurements that the UE 702 is capable of. The resource capability report 708 also includes a PRS measurement capability that identifies a number of PRS resource sets that the UE 702 is capable of concurrently processing. In some cases, the resource capability report 708 can include other information relevant to the carrier measurements such as phase information. The measurement capability report in Table 1 is one example and other implementations are possible with less information or additional parameters for a network entity's consideration. At block 710, the LMF 706 can determine resources to identify based on the capability report 708.

In some aspects, the TRP 704 may transmit QCL information 711 to the UE 702. In some aspects, a new type of QCL information can be defined that identifies multiple resources from the TRP 704 and includes any differences associated with the multiple resources. The QLC information 711 may include alignment information associated with different resources (e.g., PRS resource sets, PFLs transmitted by the TRP 704, etc.) to calibrate measurements associated with any of the different resources. As an illustrative example, the TRP 704 may transmit a first frequency layer in the 5 GHz band and a second frequency layer in the 6 GHz band using a single power amplifier, but with different impedance matching networks to handle different bandwidth regions. The different impedance matching networks will have different bandwidth characteristics and slightly different timing and, to accommodate these timing variations, the QCL information 711 can include timing differences associated with the different PFLs. In some aspects, the UE 702 can use the timing differences to correct timing issues that are present based on measuring a subcarrier set pair that includes a subcarrier in the first frequency layer and a subcarrier in the second frequency layer.

The LMF 706 can receive the resource capability report 708, determine measurement resources for the UE 702 based on the measurement capability report 708, and transmit a measurement request 712 (also referred to as a phase measurement request) including the measurement resources to the UE 702. In some aspects, the LMF 706 can use an existing measurement request 712, such as a downlink time difference of arrival (TDoA) measurement element and include the resource measurement information in reserved portions of the element. In other aspects, the LMF 706 can transmit a new element configured of identification of multiple resources. For example, Table 2 is an example of a multiple resource element request (e.g., a measurement request 712) that identifies multiple types of resources available to the UE for phase measurements.

UE 702 to measure different symbols in the different PRS resources. In one illustrative aspect, the LMF 706 may configure the UE 702 to select the at least one subcarrier pair using two different PRS resources covering different parts of a bandwidth portion (BWP). In one illustrative aspect, the LMF 706 may configure the UE 702 to select a subcarrier pair using two different PRS resources covering different PRS RE allocations.

In some aspects, the LMF 706 can also identify additional PFLs (e.g., multiple PFLs) to the UE associated with each PFL. When preparing the measurement request, the LMF 706 may determine if a phase measurement of a pair of subcarriers in different PFLs can be performed based on timing information. In one illustrative example, the TRP 704 can transmit different frequency layers using different hardware (e.g., RF chain) or the same hardware and have different timing, which affects a phase measurement. For example, if a TRP 704 transmits the different frequency layers using the same RF chain (e.g., mixer, filter, power amplifier (PA)), the different frequency layers may not have any timing difference or may have a small difference based on, for example, different impedance matching networks. In some aspects, the LMF 706 can generate a bitmap (e.g., nr-DL-PFL-LayerBitmap) that can be mapped to various configurations to identify available 702 based on the resource capability report 708, as well as multiple PRS resource sets PFLs and corresponding frequency bands available to the UE 702. In some aspects, the LMF 706 can determine whether the UE 702 has sufficient measurement

TABLE 2

```
NR-DL-MultipleResourceElement-r16 ::= SEQUENCE {
  dl-PRS-ID-r16                      INTEGER (0..255),
  nr-PhysCellID-r16                  NR-PhysCellID-r16          OPTIONAL,
  nr-CellGlobalID-r16                NCGI-r15                   OPTIONAL,
  nr-ARFCN-r16                       ARFCN-ValueNR-r15          OPTIONAL,
  nr-DL-PRS-ResourceID-r16           NR-DL-PRS-ResourceID-r16   OPTIONAL,
  nr-DL-PRS-ResourceSetID-r16          OPTIONAL,
  nr-DL-PRS-ResourceIDs              NR-DL-PRS-ResourceID-r16[0..7],
  nr-DL-PRS-ResourceSets             NR-DL-PRS-ResourceSetID-r16[0..7],
  nr-DL-PFL-LayerBitmap              NR-DL-PFL-FrequencyLayerID[0..255],
  nr-DL-PFL-PflParamters             NR-DL-PFL-FrequencyLayerID [0..7],
  nr-DL-PFL-InterResourceParams ::= SEQUENCE { based on timing information. },
  nr-DL-InterPrsMeasurmentType       INTEGER (0..7),
  nr-TimeStamp-r16                   ,
  nr-TimingQuality-r16               ,
  nr-DL-PRS-RSRP-Result-r16          INTEGER (0..126)           OPTIONAL,
  ...
}
```

In one illustrative aspect, the LMF 706 can identify (e.g., at block 710) different PRS resource sets (e.g., an array of NR-DL-PRS-ResourceSet) to make available to the UE 702 and allow the UE 702 to select subcarriers associated with different PRS resource sets. In current NR configurations, the UE 702 is provided information related to a single PRS resource set, which is illustrated in FIG. 6. When the LMF 706 provides the different PRS resource sets to the UE 702, the UE 702 can access different PRS resource sets to increase the number of subcarrier set pairs having a short equivalent wavelength (e.g., a narrowest lane or wide subcarrier pair) available to the UE 702 within that frequency layer. In some cases, the LMF 706 can configure a subcarrier pair having a long equivalent wavelength (e.g., a widest lane or a narrow subcarrier pair) for various reasons, such as to reduce effects of multipath or another parasitic effect. The LMF 706 can configure the UE 702 to measure the same symbol in the different PRS resources or can configure the capability (e.g., measurement accuracy) for wide subcarrier pairs associated with shorter measurement intervals (e.g., centimeter level accuracy).

In some aspects, the LMF 706 can configure measurements of the UE 702 in the multiple resource element request in Table 2 to include measurement parameters that may be affected by using multiple resources. In particular, the multiple resource element request in Table 2 includes an inter-PRS measurement type (e.g., nr-DL-InterPrsMeasurmentType) that identifies how to report measurements from the multiple PRS resources. The inter-PRS measurement type can identify whether the UE 702 will report a phase measurement for each symbol of the resources, a single selected symbol having a maximum or best (e.g., a floor or ceiling function), or a value computed based on each measurement of the symbols (e.g., a median, a mean, etc.). The LMF 706 may also configure different measurement types for different resources, as well as explicitly require the UE 702 to measure across different resources (e.g., different PRSs, different PFLs, etc.). At block 714, the UE 702 can determine resources in the measurement request 712 to measure based on information in the measurement request 712. The measurements can include a number of parameters such as a quantity of subcarrier pairs to measure, an equivalent wavelength of the subcarrier pair (e.g., a wide lane, a narrow lane, etc.), and a measurement step size. In some aspects, the UE 702 can measure a pair of subcarriers and each subcarrier is associated with a different resource. For example, a higher frequency subcarrier of the subcarrier pair may be associated with a different PFL than a lower frequency subcarrier of the subcarrier pair.

In some aspects, the UE 702 can also identify a symbol measured in each of the multiple resources. Currently reporting mechanisms currently support a timeslot reporting and may need to include additional information to identify the symbols. An example modification of a timestamp element is disclosed in Table 3 below and includes additional elements that identify a single frequency network (nr-SRF-r16) and a symbol position within a time slot (e.g., (nr-Slot-r16).

TABLE 3

```
NR-Timestamp-r18 ::= SEQUENCE {
  dl-PRS-ID-r16          INTEGER (0..255),
  nr-PhysCellID-r16                            OPTIONAL,
  nr-CellGlobalID-r16    NCGI-r15              OPTIONAL,
  nr-ARFCN-r16           ARFCN-ValueNR-r15     OPTIONAL,
  nr-SFN-r16             INTEGER (0..1023),
  nr-Slot-r16            CHOICE {
    scs15-r16              INTEGER (0..9),
    scs30-r16              INTEGER (0..19),
    scs60-r16              INTEGER (0..39),
    scs120-r16             INTEGER (0..79)
  },
  ...
}
```

After determining the resources to measure, the UE 702 can measure reference signals 716 that are transmitted by the TRP 704 at a first time. In some aspects, the UE 702 can measure multiple reference signals during the first time such as a different PRS resource sets, different PFLs, or different reference signals. In some aspects, the UE 702 may need to perform additional measurements based on different factors such as UE capability. For example, if the UE 702 is capable of measuring a maximum of 3 subcarrier pairs in a particular time period and the UE determines that 7 subcarrier pairs will be measured, the UE will need to perform measurements at a different time. The UE 702 can therefore measure the reference signals 718 at a second time. In some cases, the UE 702 can also perform another positioning process at block 720, such as a TDoA.

At block 720, the UE 702 generates a measurement report 722 that includes the results of the phase measurements and transmits the phase measurement report 722 to the LMF 706. In some aspects, the UE 702 can include multiple phase measurements, and the phase measurements can identify various parameters such as a PRS identifier of the PRS, a PFL identifier of the PFL, subcarriers, and other relevant information. As noted above, the measurements can include a timestamp that identifies a symbol in the time slot that the device measured. In this example, the network entity can use the various information and provide any corrections due to any relevant considerations such as fading, timing, differences in symbols, etc.

The LMF 706 receives the phase measurement report 722 and determines a location of the UE 702 using various information at block 724. In some aspects, the LMF 706 may be able to use the measured phase information to identify a precise location of the UE 702. In other aspects, the LMF 706 can use both positioning techniques (e.g., TDoA and phase positioning) to determine a precise location or may use one positioning technique to refine or verify the location of the UE 702.

Figures 8A, 8B:
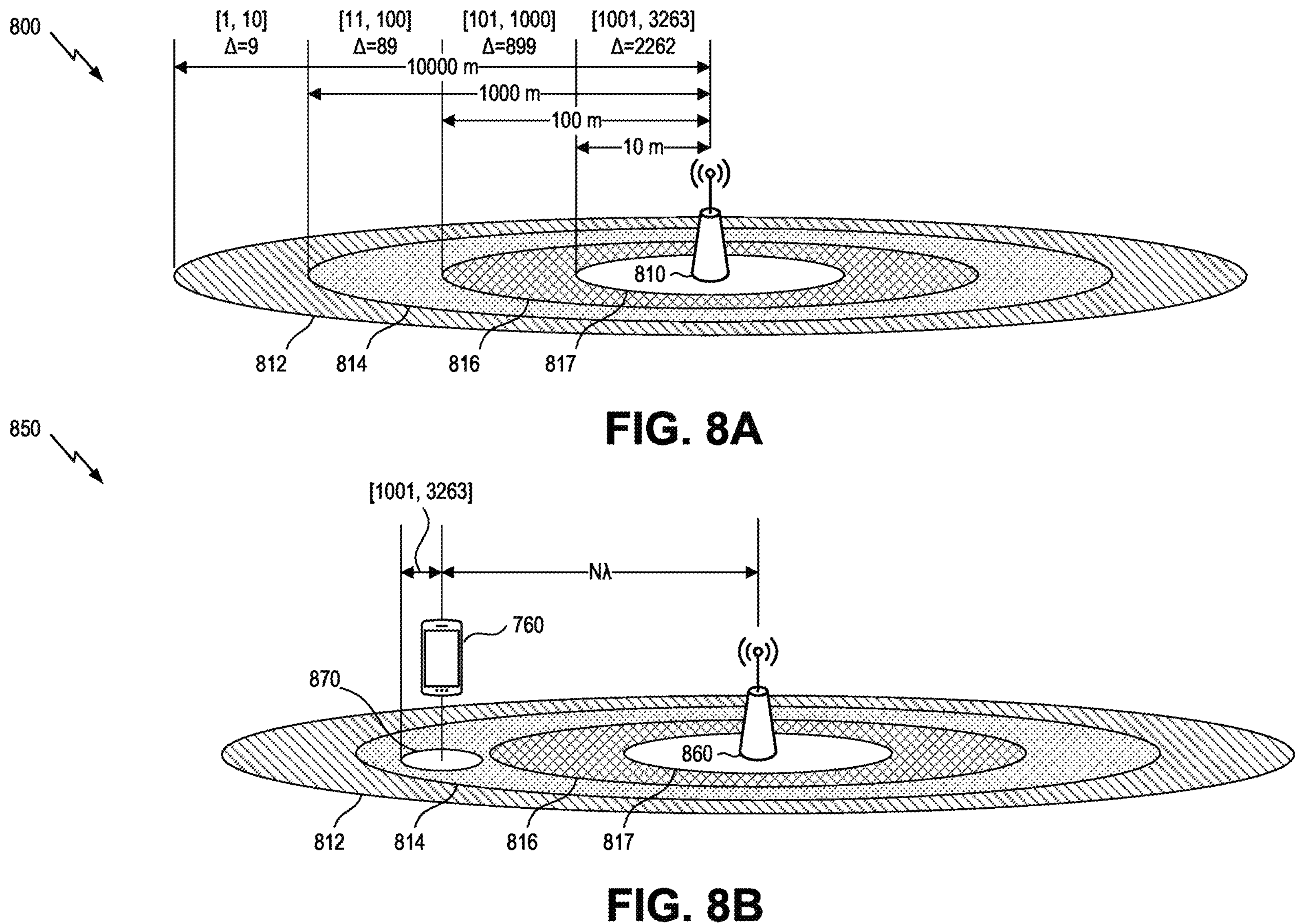
FIG. 8A is an illustration of wireless communication system and different subcarrier pair configurations for measuring phase and determining a location from a transmitting device, according to some aspects of the present disclosure.
FIG. 8B is an illustration of wireless communication system and combining phase measurements of different subcarrier pair configurations to improve determining a location from a transmitting device, according to some aspects of the present disclosure.

FIG. 8A is an illustration of wireless communication system 800 and different subcarrier pair configurations for measuring phase and determining a location from a transmitting device, according to some aspects of the present disclosure. As noted above, subcarriers can be grouped for various purposes. In some aspects, a TRP 810 is configured to transmit a reference signal (e.g., PRS, TRS, PTRS, CRS, DMRS, CSI-RS, SRS, PSS, SSS, and SSB) using different subcarriers and the reference signals can be transmitted in a pattern such as a comb structure. In some aspects, the TRP 810 can group different subcarrier pair configurations based on a difference (or a distance) of the subcarrier indexes.

The TRP 810 in this example has created a narrow subcarrier pair configuration 812 having a lower subcarrier boundary of 1 and an upper subcarrier boundary of 10, or a maximum difference of 9. In this case, the subcarriers in this group will have a minimum equivalent distance of approximately 1,000 m and a maximum equivalent distance of approximately 10,000 m. The subcarrier pair configuration 814 has a minimum equivalent distance of approximately 100 m and a maximum equivalent distance of approximately 1,000 m. The subcarrier pair configuration 816 has a minimum equivalent distance of approximately 10 m and a maximum equivalent distance of approximately 1,000 m. The subcarrier pair configuration 817 has a minimum equivalent distance of approximately 3 m based on the widest configuration noted above and a maximum equivalent distance of approximately 10 m.

FIG. 8B is an illustration of wireless communication system 850 and combining phase measurements of different subcarrier pair configurations to improve determining a location from a transmitting device. In some aspects, measurements provided by different subcarrier pair configurations can be combined to more accurately determine a location within a region 870. In the wireless communication system 850, the UE 860 is positioned within a region associated with either the subcarrier pair configuration 812 or the subcarrier pair configuration 814. The LMF can instruct the UE 860 to perform various measurements using any of the subcarrier pair configurations. For example, the LMF can determine that distances to the UE 860 determined using the subcarrier pair configuration 812 or the subcarrier pair configuration 814 at least partially overlap and the LMF may identify an approximate distance to the UE 860 based on the accuracy of the subcarrier pair configuration 814. In some aspects, the LMF can also combine the phase measurement with other distance estimation techniques such as RSTD, TDoA, etc.

The LMF may transmit a measurement report to the UE 860 that indicates an estimated distance from the TRP 810 and the UE 860 can determine a number of cycles associated with each subcarrier of a wider subcarrier configuration pair. The UE 860 can measure the phase difference of the wider subcarrier configuration pair and the UE 860 or LMF can determine a location of the UE 860 within region 870 because the number of cycles is not unknown. For example, the UE 860 or LMF could identify the number of cycles (e.g., $N_k$ and $N_{k-m}$) for a subcarrier pair of a wider subcarrier configuration (e.g., having a shorter equivalent wavelength) and then determine the distance using Equation 8. Based on the shorter equivalent wavelength of the wider subcarrier pair, the UE or the LMF can identify a more precise location within the region 870. In this case, the different measurements could be simultaneous or sequential.

Figure 9:
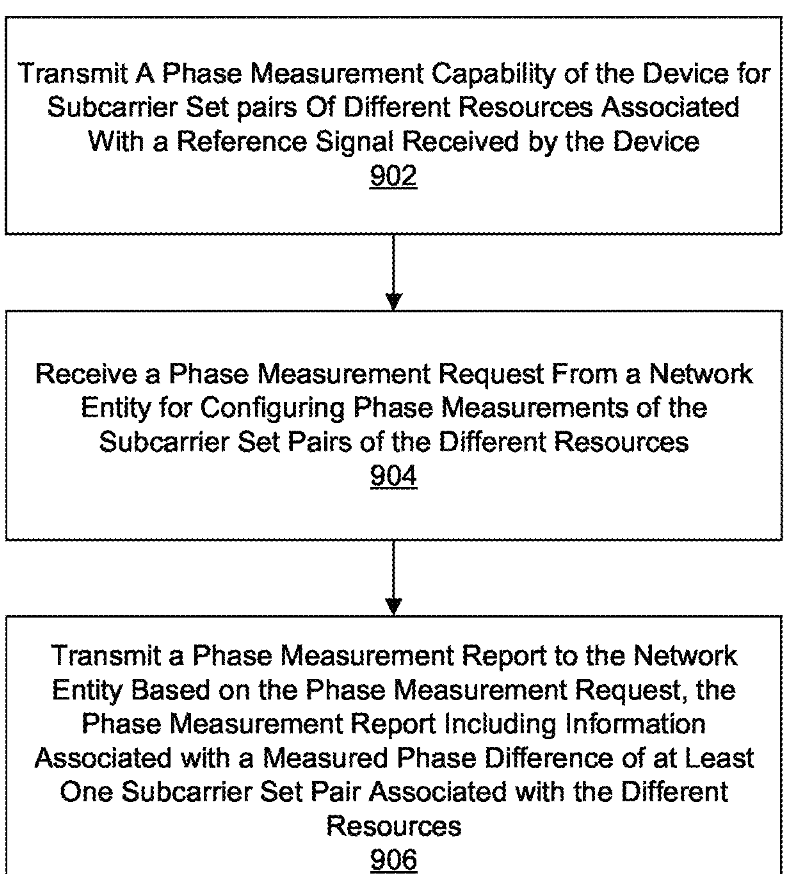
FIG. 9 is a flow chart illustrating an example of a process 900 for wireless communications, according to some aspects of the present disclosure.

FIG. 9 is a flow chart illustrating an example of a process 900 for wireless communications. For instance, the process 900 can be used for estimating distances to a UE, according to the systems and techniques described herein. The process 900 can be performed by a computing device or apparatus, such as a wireless communications device (e.g., a UE), or a component or system (e.g., a chipset) of the wireless communication device. The operations of the process 900 may be implemented as software components that are executed and run on one or more processors (e.g., processor(s) 1184 of FIG. 11, processor 1212 of FIG. 12, or other processor (s)). Further, the transmission and reception of signals by the wireless communications device in the process 900 may be enabled, for example, by one or more antennas (e.g., antenna 1187 of FIG. 11) and/or one or more transceivers (e.g., wireless transceiver(s) 1178 of FIG. 11).

At block 902, the computing device (or component thereof) transmits, to a network entity (e.g., a gNB, an LMF, etc.), a phase measurement capability of the device for subcarrier set pairs of different resources received by the device. For instance, the computing device can identify the different resources being associated with a reference signal and provide the different resources to the network entity. As described above, a subcarrier set includes at least one subcarrier. For instance, as noted above, one example of a "set of subcarriers" is a set with a single subcarrier. In such cases, a pair of subcarriers includes two subcarriers (as each set would include a single subcarrier). In some examples, "X subcarriers" (e.g., consecutive subcarriers) can be included in a set of subcarriers, in which case the wireless communication device can derive a single phase measurement for the set of subcarriers including X subcarriers. The measurement report can include the measured phase difference(s) between the at least one subcarrier set pair or can include the measured phases (in which case the first network entity or other network entity can determine the phase difference(s)).

In some examples, the phase measurement capability can include a capability of the device to determine phase differences between reference signal resources of a common set of reference signal resource sets associated with the reference signal. The phase measurement capability can also include a capability of the device to determine phase differences between reference signal resources of different reference signal resource sets of a same TRP and the different reference signal resource sets may be associated with the reference signal. In other aspects, the phase measurement capability includes a capability of the device to determine phase differences between reference signal resources of different reference signal resource sets of different TRPs, with the different reference signal resource sets being associated with the reference signal. The phase measurement capability may include a capability of the device to determine phase differences between reference signal resources of different positioning frequency layers. In some aspects, the phase measurement capability includes a capability of the UE device to determine phase differences between reference signal resources of different positioning frequency layers.

At block 904, the computing device (or component thereof) receives, from the network entity (e.g., the gNB, LMF, etc.), a phase measurement request for configuring phase measurements of the subcarrier set pairs of the different resources.

In some aspects, the device may receive configuration information from the network entity that is based on the phase measurement capability of the device. In one example, the configuration information can indicate the device to measure the at least one subcarrier set pair using multiple reference signal resources configured on common symbols. The configuration information can have many different permutations. For example, the configuration information can indicate to the device to measure the at least one subcarrier set pair using multiple reference signal resources configured on different symbols. The configuration information can indicate to the device to measure the at least one subcarrier set pair using at least two different reference signal resources covering different parts of a BWP. Alternatively or additionally, the configuration information can indicate to the device to measure the at least one subcarrier set pair using at least two different reference signal resources covering different RE allocations of a reference signal resource.

At block 906, the computing device (or component thereof) transmits a phase measurement report to the network entity based on the phase measurement request. The phase measurement report may include information associated with a measured phase difference of at least one subcarrier set pair associated with the different resources. In some aspects, the phase measurement report can be based on the phase measurement request. For example, the phase measurement request can request the phase measurement report to include a phase measurement for each symbol of one or more symbols associated with a reference signal resource of the reference signal. Additional examples of content to include in the phase measurement report include a phase measurement associated with a best measured phase difference among a set of symbols associated with a reference signal resource of the reference signal, a representative phase measurement associated with a representative phase difference among a set of symbols associated with a reference signal resource of the reference signal, a maximum number of subcarrier phase measurements for the device to at least one of perform or report for a reference signal resource of the reference signal, a plurality of measurements associated with a reference signal resource of the reference signal, a plurality of measurements associated with a reference signal resource of the reference signal, a timestamp corresponding to a symbol associated with each measurement, any combination thereof, and/or other content.

Figure 10:
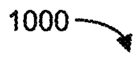
FIG. 10 is a flow chart illustrating an example of a process 900 for wireless communications, according to some aspects of the present disclosure.
Figure 10:
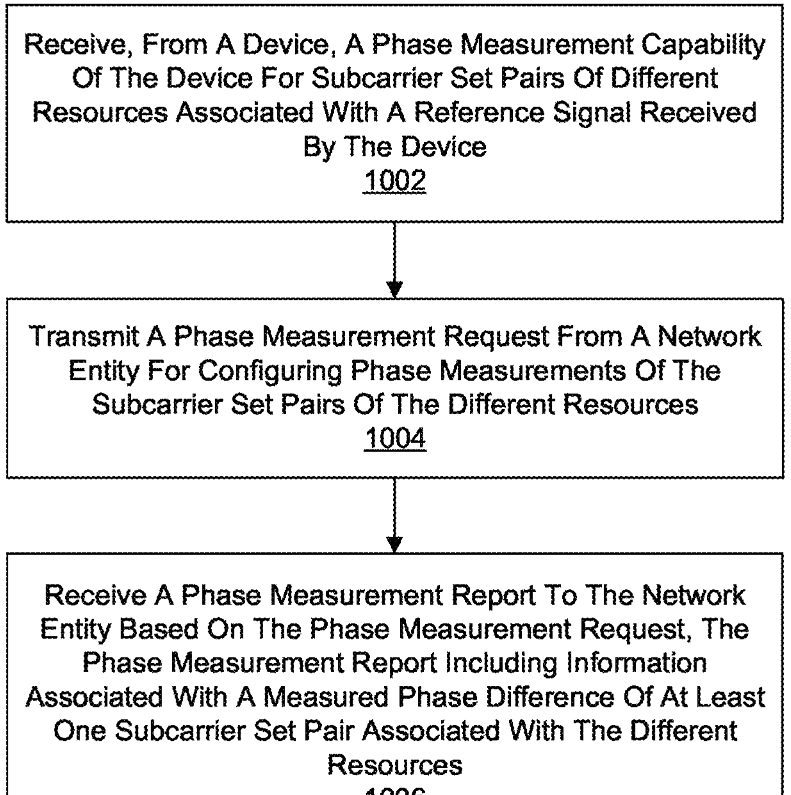

FIG. 10 is a flow chart illustrating an example of a process 1000 for wireless communications. For instance, the process 1000 can be used for estimating distances to a UE, according to the systems and techniques described herein. The process 1000 can be performed by a network entity (e.g., an eNB, a gNB, a location server such as an LMF, or a portion thereof, such as one or more of a CU, a DU, a RU, a Near-RT RIC, or a Non-RT RIC) or by a component or system (e.g., a chipset) of the network entity. The operations of the process 1000 may be implemented as software components that are executed and run on one or more processors (e.g., processor 1212 of FIG. 12 or other processor(s)). Further, the transmission and reception of signals by the wireless communications device in the process 1000 may be enabled, for example, by one or more antennas and/or one or more transceivers (e.g., wireless transceiver(s)).

At block 1002, the network entity (or component thereof) receives, from a device (e.g., a gNB, a UE, etc.), a phase measurement capability of the device for subcarrier set pairs of different resources received by the device, the different resources being associated with a reference signal. In some aspects, the device can identify the different resources being associated with a reference signal and provide the different resources to the network entity.

In some examples, the phase measurement capability can include a capability of the device to determine phase differences between reference signal resources of a common set of reference signal resource sets associated with the reference signal. The phase measurement capability can also include a capability of the device to determine phase differences between reference signal resources of different reference signal resource sets of a same TRP and the different reference signal resource sets may be associated with the reference signal. In other aspects, the phase measurement capability includes a capability of the device to determine phase differences between reference signal resources of different reference signal resource sets of different TRPs, with the different reference signal resource sets being associated with the reference signal. The phase measurement capability may include a capability of the device to determine phase differences between reference signal resources of different positioning frequency layers. In some aspects, the phase measurement capability includes a capability of the UE device to determine phase differences between reference signal resources of different positioning frequency layers.

At block 1004, the network entity (or component thereof) transmits, to the device, a phase measurement request from a network entity for configuring phase measurements of the subcarrier set pairs of the different resources. The phase measurement request can provide instructions for the device to determine and then provide various information in the phase measurement report. For instance, the phase measurement request may instruct the device to report a phase measurement for each symbol of one or more symbols associated with a reference signal resource of the reference signal. Other examples of information to include in the phase measurement report include a phase measurement associated with a best measured phase difference among a set of symbols associated with a reference signal resource of the reference signal, a representative phase measurement associated with a representative phase difference among a set of symbols associated with a reference signal resource of the reference signal, a maximum number of subcarrier phase measurements for the device to at least one of perform or report for a reference signal resource of the reference signal, a plurality of measurements associated with a reference signal resource of the reference signal, or a plurality of measurements associated with a reference signal resource of the reference signal.

In some aspects, the network entity (or component thereof) can transmit, to the device, configuration information based on the phase measurement capability of the device. In one example, the configuration information can indicate to the device to measure the at least one subcarrier set pair using multiple reference signal resources configured on common symbols. In another example, the configuration information can indicate to the device to measure the at least one subcarrier set pair using multiple reference signal resources configured on different symbols. The configuration information may also to the UE to measure the at least one subcarrier set pair using at least two different reference signal resources covering different parts of a BWP. The configuration information can indicate to the device to measure the at least one subcarrier set pair using at least two different reference signal resources covering different RE allocations of a reference signal resource.

At block 1006, the network entity (or component thereof) receives, from the device, a phase measurement report to the network entity based on the phase measurement request that includes information associated with a measured phase difference of at least one subcarrier set pair associated with the different resources. The phase measurement report can include a measurement for each symbol of a reference signal resource.

Figure 11:
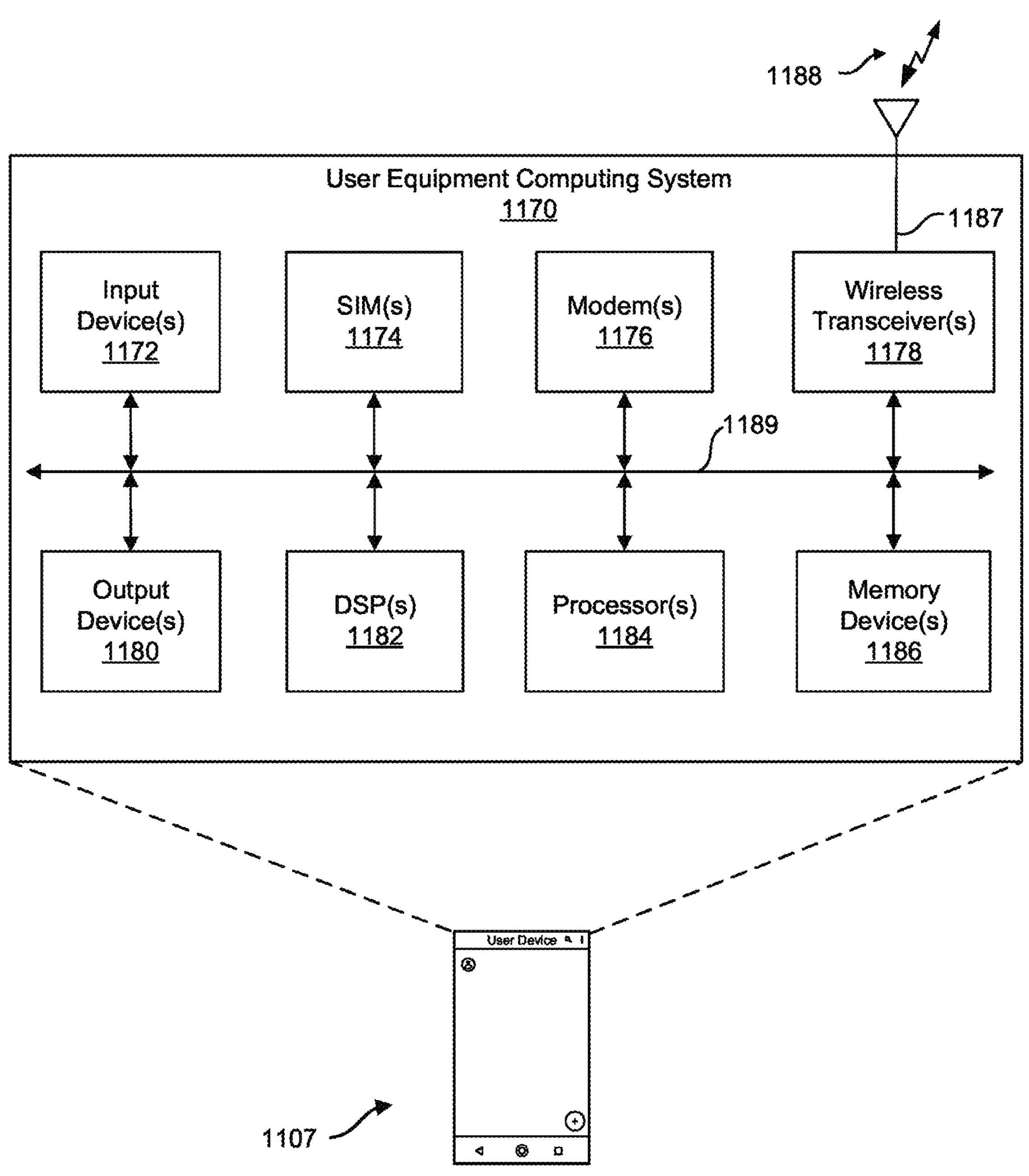
FIG. 11 illustrates an example block diagram of a computing system of a UE, in accordance with some aspects of the present disclosure.

FIG. 11 illustrates an example of a computing system 1170 of a UE 1107. In some examples, the UE 1107 can include a mobile phone, router, tablet computer, laptop computer, tracking device, wearable device (e.g., a smart watch, glasses, an XR device, etc.), IoT device, and/or other device used by a user to communicate over a wireless communications network. The computing system 1170 includes software and hardware components that can be electrically coupled via a bus 1189 (or may otherwise be in communication, as appropriate). For example, the computing system 1170 includes one or more processors 1184. The one or more processors 1184 can include one or more CPUs, ASICs, FPGAS, APs, GPUs, VPUs, NSPs, microcontrollers, dedicated hardware, any combination thereof, and/or other processing device or system. The bus 1189 can be used by the one or more processors 1184 to communicate between cores and/or with the one or more memory devices 1186.

The computing system 1170 may also include one or more memory devices 1186, one or more digital signal processors (DSPs) 1182, one or more subscriber identity modules (SIMs) 1174, one or more modems 1176, one or more wireless transceivers 1178, an antenna 1187, one or more input devices 1172 (e.g., a camera, a mouse, a keyboard, a touch sensitive screen, a touch pad, a keypad, a microphone, and/or the like), and one or more output devices 1180 (e.g., a display, a speaker, a printer, and/or the like). As used herein, the one or more wireless transceivers 1178 can include one or more receiving devices (e.g., receivers) and/or one or more transmitting devices (e.g., transmitters).

The one or more wireless transceivers 1178 can transmit and receive wireless signals (e.g., signal 1188) via antenna 1187 to and from one or more other devices, such as one or more other UEs, network devices (e.g., base stations such as eNBs and/or gNBs, WiFi routers, etc.), cloud networks, and/or the like. As described herein, the one or more wireless transceivers 1178 can include a combined transmitter/receiver, discrete transmitters, discrete receivers, or any combination thereof. In some examples, the computing system 1170 can include multiple antennae. The wireless signal 1188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 1178 may include a RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 1188 into a baseband or intermediate frequency and can convert the RF signals to the digital domain.

In some cases, the computing system 1170 can include a coding-decoding device (or CODEC) configured to encode and/or decode data transmitted and/or received using the one or more wireless transceivers 1178. In some cases, the computing system 1170 can include an encryption-decryption device or component configured to encrypt and/or decrypt data (e.g., according to the AES and/or DES standard) transmitted and/or received by the one or more wireless transceivers 1178.

The one or more SIMs 1174 can each securely store an International Mobile Subscriber Identity (IMSI) number and a related key assigned to the user of the UE 1107. The IMSI and the key can be used to identify and authenticate the subscriber when accessing a network provided by a network service provider or operator associated with the one or more SIMs 1174.

The one or more modems 1176 can modulate one or more signals to encode information for transmission using the one or more wireless transceivers 1178. The one or more modems 1176 can also demodulate signals received by the one or more wireless transceivers 1178 in order to decode the transmitted information. In some examples, the one or more modems 1176 can include a 4G (or LTE) modem, a 5G (or NR) modem, a Bluetooth™ modem, a modem configured for vehicle-to-everything (V2X) communications, and/or other types of modems. In some examples, the one or more modems 1176 and the one or more wireless transceivers 1178 can be used for communicating data for the one or more SIMs 1174.

The computing system 1170 can also include (and/or be in communication with) one or more non-transitory machine-readable storage media or storage devices (e.g., one or more memory devices 1186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 1186 and executed by the one or more processor(s) 1184 and/or the one or more DSPs 1182. The computing system 1170 can also include software elements (e.g., located within the one or more memory devices 1186), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the UE 1107 can include means for performing operations described herein. The means can include one or more of the components of the computing system 1170. For example, the means for performing operations described herein may include one or more of input device(s) 1172, SIM(s) 1174, modems(s) 1176, wireless transceiver(s) 1178, output device(s) 1180, DSP(s) 1182, processors 1184, memory device(s) 1186, and/or antenna(s) 1187.

In some aspects, the UE 1107 can include means for receiving resource configuration information, wherein the resource configuration information is based on a threshold associated with the apparatus, and wherein the resource configuration information indicates a time-gap for transmission of SRS resources. In some aspects, the UE 1107 may further include means for transmitting one or more SRS resources based on the time-gap indicated by the resource configuration information.

In some examples, the means for receiving can include the one or more wireless transceivers 1178, the one or more modems 1176, the one or more SIMs 1174, the one or more processors 1184, the one or more DSPs 1182, the one or more memory devices 1186, any combination thereof, or other component(s) of the client device. In some examples, the means for determining can include the one or more processors 1184, the one or more DSPs 1182, the one or more memory devices 1186, any combination thereof, or other component(s) of the client device. In some examples, the means for transmitting can include the one or more wireless transceivers 1178, the one or more modems 1176, the one or more SIMs 1174, the one or more processors 1184, the one or more DSPs 1182, the one or more memory devices 1186, any combination thereof, or other component(s) of the client device.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), DSPs, central processing units (CPUs), and/or other suitable electronic circuits), and/or can include and/or be implemented using computer software, firmware, or any combination thereof, to perform the various operations described herein.

Figure 12:
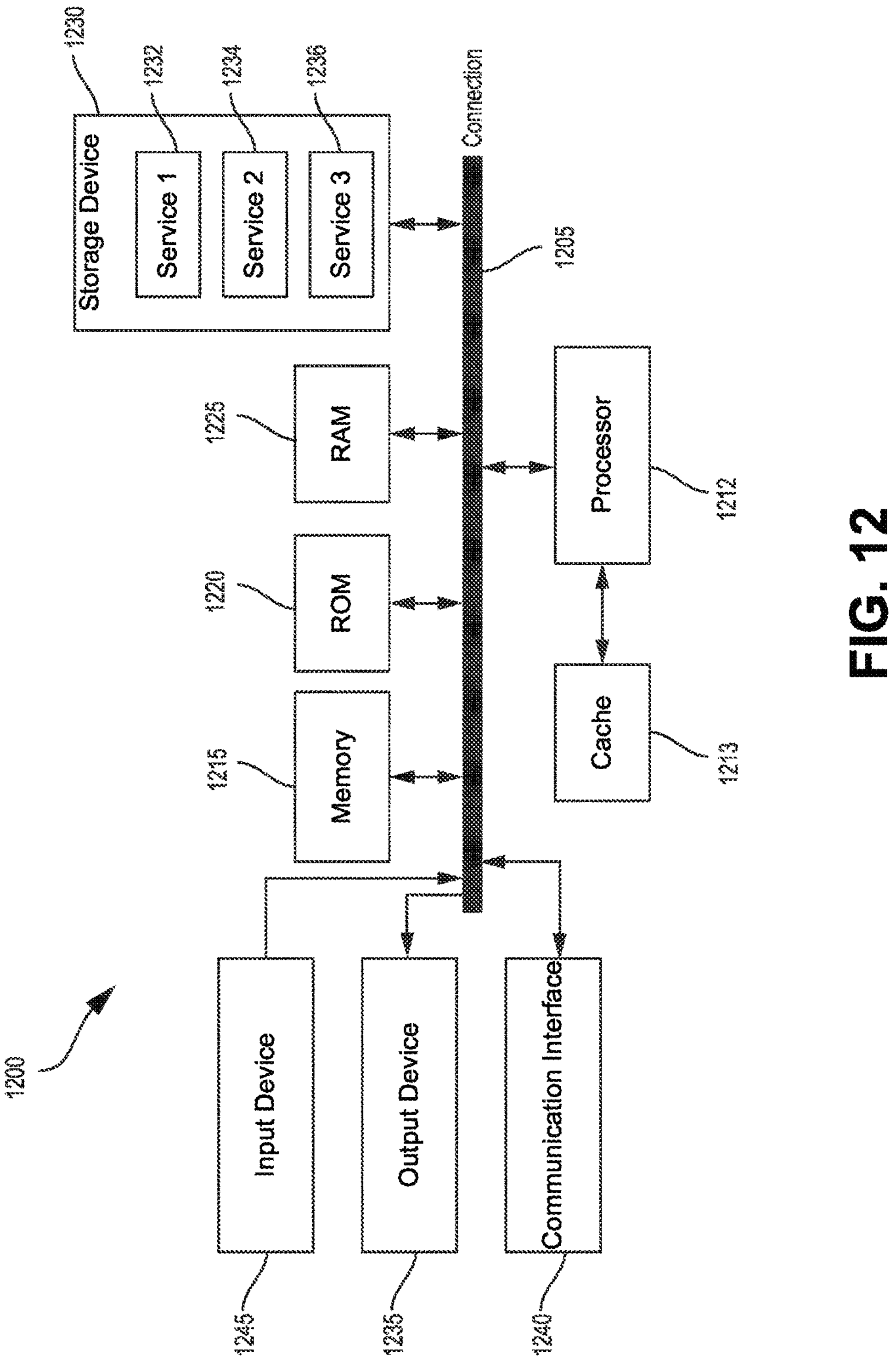
FIG. 12 illustrates an example computing system, according to aspects of the disclosure.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that couples various system components including system memory 1215, such as read-only memory (ROM) 1220 and random-access memory (RAM) 1225 to processor 1210.

Computing system 1200 can include a cache 1213 of high-speed memory connected directly with, in close proximity to, or integrated as part of processor 1210.

Processor 1210 can include any general-purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, DSRC wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1240 may also include one or more GNSS receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of wireless communication at a user equipment (UE), comprising: transmitting, at the UE to a network entity, a phase measurement capability of the UE for subcarrier set pairs of different resources received by the UE, the different resources being associated with a reference signal; receiving, at the UE, a phase measurement request from a network entity for configuring phase measurements of the subcarrier set pairs of the different resources; and transmitting a phase measurement report to the network entity based on the phase measurement request, the phase measurement report including information associated with a measured phase difference of at least one subcarrier set pair associated with the different resources.

Aspect 2: The method of Aspect 1, wherein the phase measurement capability includes a capability of the UE to determine phase differences between reference signal resources of a common set of reference signal resource sets associated with the reference signal.

Aspect 3: The method of any of Aspects 1 to 2, wherein the phase measurement capability includes a capability of the UE to determine phase differences between reference signal resources of different reference signal resource sets of a same transmission-reception point (TRP), the different reference signal resource sets being associated with the reference signal.

Aspect 4: The method of any of Aspects 1 to 3, wherein the phase measurement capability includes a capability of the UE to determine phase differences between reference signal resources of different reference signal resource sets of different transmission-reception points (TRPs), the different reference signal resource sets being associated with the reference signal.

Aspect 5: The method of any of Aspects 1 to 4, wherein the phase measurement capability includes a capability of the UE to determine phase differences between reference signal resources of different positioning frequency layer.

Aspect 6: The method of any of Aspects 1 to 5, further comprising: receiving, at the UE from the network entity, configuration information based on the phase measurement capability of the UE, the configuration information indicating to the UE to measure the at least one subcarrier set pair using multiple reference signal resources configured on common symbols.

Aspect 7: The method of any of Aspects 1 to 6, further comprising: receiving, at the UE from the network entity, configuration information based on the phase measurement capability of the UE, the configuration information indicating to the UE to measure the at least one subcarrier set pair using multiple reference signal resources configured on different symbols.

Aspect 8: The method of any of Aspects 1 to 7, further comprising: receiving, at the UE from the network entity, configuration information based on the phase measurement capability of the UE, the configuration information indicating to the UE to measure the at least one subcarrier set pair using at least two different reference signal resources covering different parts of a bandwidth part (BWP).

Aspect 9: The method of any of Aspects 1 to 8, further comprising: receiving, at the UE from the network entity, configuration information based on the phase measurement capability of the UE, the configuration information indicating to the UE to measure the at least one subcarrier set pair using at least two different reference signal resources covering different resource element (RE) allocations of a reference signal resource.

Aspect 10: The method of any of Aspects 1 to 9, wherein, based on the phase measurement request, the phase measurement report includes a phase measurement for each symbol of one or more symbols associated with a reference signal resource of the reference signal.

Aspect 11: The method of any of Aspects 1 to 10, wherein, based on the phase measurement request, the phase measurement report includes a phase measurement associated with a best measured phase difference among a set of symbols associated with a reference signal resource of the reference signal.

Aspect 12: The method of any of Aspects 1 to 11, wherein, based on the phase measurement request, the phase measurement report includes a representative phase measurement associated with a representative phase difference among a set of symbols associated with a reference signal resource of the reference signal.

Aspect 13: The method of any of Aspects 1 to 12, wherein the phase measurement request includes a maximum number of subcarrier phase measurements for the UE to at least one of perform or report for a reference signal resource of the reference signal.

Aspect 14: The method of any of Aspects 1 to 13, wherein, based on the phase measurement request, the phase measurement report includes a plurality of measurements associated with a reference signal resource of the reference signal.

Aspect 15: The method of any of Aspects 1 to 14, wherein, based on the phase measurement request, the phase measurement report includes a measurement for each symbol of a reference signal resource.

Aspect 16: The method of any of Aspects 1 to 15, wherein each measurement in the phase measurement report includes a timestamp corresponding to a symbol associated with each measurement.

Aspect 17: A method of wireless communication at a network entity, comprising: receiving, at the network entity from a user equipment (UE), a phase measurement capability of the UE for subcarrier set pairs of different resources received by the UE, the different resources being associated with a reference signal; transmitting, at the network entity to the UE, a phase measurement request from a network entity for configuring phase measurements of the subcarrier set pairs of the different resources; and receiving, at the network entity from the UE, a phase measurement report to the network entity based on the phase measurement request, the phase measurement report including information associated with a measured phase difference of at least one subcarrier set pair associated with the different resources.

Aspect 18: The method of Aspect 17, wherein the phase measurement capability includes a capability of the UE to determine phase differences between reference signal resources of a common set of reference signal resource sets associated with the reference signal.

Aspect 19: The method of any of Aspects 17 to 18, wherein the phase measurement capability includes a capability of the UE to determine phase differences between reference signal resources of different reference signal resource sets of a same transmission-reception point (TRP), the different reference signal resource sets being associated with the reference signal.

Aspect 20: The method of any of Aspects 17 to 19, wherein the phase measurement capability includes a capability of the UE to determine phase differences between reference signal resources of different reference signal resource sets of different transmission-reception points (TRPs), the different reference signal resource sets being associated with the reference signal.

Aspect 21: The method of any of Aspects 17 to 20, wherein the phase measurement capability includes a capability of the UE to determine phase differences between reference signal resources of different positioning frequency layer.

Aspect 22: The method of any of Aspects 17 to 21, further comprising: transmitting, to the UE, configuration information based on the phase measurement capability of the UE, the configuration information indicating to the UE to measure the at least one subcarrier set pair using multiple reference signal resources configured on common symbols.

Aspect 23: The method of any of Aspects 17 to 22, further comprising: transmitting, to the UE, configuration information based on the phase measurement capability of the UE, the configuration information indicating to the UE to measure the at least one subcarrier set pair using multiple reference signal resources configured on different symbols.

Aspect 24: The method of any of Aspects 17 to 23, further comprising: transmitting, to the UE, configuration information based on the phase measurement capability of the UE, the configuration information indicating to the UE to measure the at least one subcarrier set pair using at least two different reference signal resources covering different parts of a bandwidth part (BWP).

Aspect 25: The method of any of Aspects 17 to 24, further comprising: transmitting, to the UE, configuration information based on the phase measurement capability of the UE, the configuration information indicating to the UE to measure the at least one subcarrier set pair using at least two different reference signal resources covering different resource element (RE) allocations of a reference signal resource.

Aspect 26: The method of any of Aspects 17 to 25, wherein, based on the phase measurement request, the phase measurement report includes a phase measurement for each symbol of one or more symbols associated with a reference signal resource of the reference signal.

Aspect 27: The method of any of Aspects 17 to 26, wherein, based on the phase measurement request, the phase measurement report includes a phase measurement associated with a best measured phase difference among a set of symbols associated with a reference signal resource of the reference signal.

Aspect 28: The method of any of Aspects 17 to 27, wherein, based on the phase measurement request, the phase measurement report includes a representative phase measurement associated with a representative phase difference among a set of symbols associated with a reference signal resource of the reference signal.

Aspect 29: The method of any of Aspects 17 to 28, wherein the phase measurement request includes a maximum number of subcarrier phase measurements for the UE to at least one of perform or report for a reference signal resource of the reference signal.

Aspect 30: The method of any of Aspects 17 to 29, wherein, based on the phase measurement request, the phase measurement report includes a plurality of measurements associated with a reference signal resource of the reference signal.

Aspect 31: An apparatus for wireless communications, comprising: a memory; one or more processors coupled to the memory, the one or more processors being configured to: transmit, to a network entity, a phase measurement capability of the apparatus for subcarrier set pairs of different resources received by the apparatus, the different resources be associated with a reference signal; receive a phase measurement request from a network entity for configure phase measurements of the subcarrier set pairs of the different resources; and transmit a phase measurement report to the network entity based on the phase measurement request, the phase measurement report including information associated with a measured phase difference of at least one subcarrier set pair associated with the different resources.

Aspect 32: The apparatus of Aspect 31, wherein the phase measurement capability includes a capability of the apparatus to determine phase differences between reference signal resources of a common set of reference signal resource sets associated with the reference signal.

Aspect 33: The apparatus of any of Aspects 31 to 32, wherein the phase measurement capability includes a capability of the apparatus to determine phase differences between reference signal resources of different reference signal resource sets of a same transmission-reception point (TRP), the different reference signal resource sets being associated with the reference signal.

Aspect 34: The apparatus of any of Aspects 31 to 33, wherein the phase measurement capability includes a capability of the apparatus to determine phase differences between reference signal resources of different reference signal resource sets of different transmission-reception points (TRPs), the different reference signal resource sets being associated with the reference signal.

Aspect 35: The apparatus of any of Aspects 31 to 34, wherein the phase measurement capability includes a capability of the apparatus to determine phase differences between reference signal resources of different positioning frequency layer.

Aspect 36: The apparatus of any of Aspects 31 to 35, wherein the one or more processors are configured to: receive, from the network entity, configuration information based on the phase measurement capability of the apparatus, the configuration information indicating to the apparatus to measure the at least one subcarrier set pair use multiple reference signal resources configured on common symbols.

Aspect 37: The apparatus of any of Aspects 31 to 36, wherein the one or more processors are configured to: receive, from the network entity, configuration information based on the phase measurement capability of the apparatus, the configuration information indicating to the apparatus to measure the at least one subcarrier set pair use multiple reference signal resources configured on different symbols.

Aspect 38: The apparatus of any of Aspects 31 to 37, wherein the one or more processors are configured to: receive, from the network entity, configuration information based on the phase measurement capability of the apparatus, the configuration information indicating to the apparatus to measure the at least one subcarrier set pair using at least two different reference signal resources covering different parts of a bandwidth part (BWP).

Aspect 39: The apparatus of any of Aspects 31 to 38, wherein the one or more processors are configured to: receive, from the network entity, configuration information based on the phase measurement capability of the apparatus, the configuration information indicating to the apparatus to measure the at least one subcarrier set pair using at least two different reference signal resources cover different resource element (RE) allocations of a reference signal resource.

Aspect 40: The apparatus of any of Aspects 31 to 39, wherein, based on the phase measurement request, the phase measurement report includes a phase measurement for each symbol of one or more symbols associated with a reference signal resource of the reference signal.

Aspect 41: The apparatus of any of Aspects 31 to 40, wherein, based on the phase measurement request, the phase measurement report includes a phase measurement associated with a best measured phase difference among a set of symbols associated with a reference signal resource of the reference signal.

Aspect 42: The apparatus of any of Aspects 31 to 41, wherein, based on the phase measurement request, the phase measurement report includes a representative phase measurement associated with a representative phase difference among a set of symbols associated with a reference signal resource of the reference signal.

Aspect 43: The apparatus of any of Aspects 31 to 42, wherein the phase measurement request includes a maximum number of subcarrier phase measurements for the apparatus to at least one of perform or report for a reference signal resource of the reference signal.

Aspect 44: The apparatus of any of Aspects 31 to 43, wherein, based on the phase measurement request, the phase measurement report includes a plurality of measurements associated with a reference signal resource of the reference signal.

Aspect 45: The apparatus of any of Aspects 31 to 44, wherein, based on the phase measurement request, the phase measurement report includes a measurement for each symbol of a reference signal resource.

Aspect 46: The apparatus of any of Aspects 31 to 45, wherein each measurement in the phase measurement report includes a timestamp corresponding to a symbol associated with each measurement.

Aspect 47: An apparatus for wireless communications, comprising: a memory; one or more processors coupled to the memory, the one or more processors being configured to: receive, from a user equipment (UE), a phase measurement capability of the UE for subcarrier set pairs of different resources received by the UE, the different resources be associated with a reference signal; transmit, to the UE, a phase measurement request from a network entity for configure phase measurements of the subcarrier set pairs of the different resources; and receive, from the UE, a phase measurement report to the network entity based on the phase measurement request, the phase measurement report including information associated with a measured phase difference of at least one subcarrier set pair associated with the different resources.

Aspect 48: The apparatus of Aspect 47, wherein the phase measurement capability includes a capability of the UE to determine phase differences between reference signal resources of a common set of reference signal resource sets associated with the reference signal.

Aspect 49: The apparatus of any of Aspects 47 to 48, wherein the phase measurement capability includes a capability of the UE to determine phase differences between reference signal resources of different reference signal resource sets of a same transmission-reception point (TRP), the different reference signal resource sets being associated with the reference signal.

Aspect 50: The apparatus of any of Aspects 47 to 49, wherein the phase measurement capability includes a capability of the UE to determine phase differences between reference signal resources of different reference signal resource sets of different transmission-reception points (TRPs), the different reference signal resource sets being associated with the reference signal.

Aspect 51: The apparatus of any of Aspects 47 to 50, wherein the phase measurement capability includes a capability of the UE to determine phase differences between reference signal resources of different positioning frequency layer.

Aspect 52: The apparatus of any of Aspects 47 to 51, wherein the one or more processors are configured to: transmit, to the UE, configuration information based on the phase measurement capability of the UE, the configuration information indicating to the UE to measure the at least one subcarrier set pair use multiple reference signal resources configured on common symbols.

Aspect 53: The apparatus of any of Aspects 47 to 52, wherein the one or more processors are configured to: transmit, to the UE, configuration information based on the phase measurement capability of the UE, the configuration information indicating to the UE to measure the at least one subcarrier set pair use multiple reference signal resources configured on different symbols.

Aspect 54: The apparatus of any of Aspects 47 to 53, wherein the one or more processors are configured to: transmit, to the UE, configuration information based on the phase measurement capability of the UE, the configuration information indicating to the UE to measure the at least one subcarrier set pair using at least two different reference signal resources covering different parts of a bandwidth part (BWP).

Aspect 55: The apparatus of any of Aspects 47 to 54, wherein the one or more processors are configured to: transmit, to the UE, configuration information based on the phase measurement capability of the UE, the configuration information indicating to the UE to measure the at least one subcarrier set pair using at least two different reference signal resources covering different resource element (RE) allocations of a reference signal resource.

Aspect 56: The apparatus of any of Aspects 47 to 55, wherein, based on the phase measurement request, the phase measurement report includes a phase measurement for each symbol of one or more symbols associated with a reference signal resource of the reference signal.

Aspect 57: The apparatus of any of Aspects 47 to 56, wherein, based on the phase measurement request, the phase measurement report includes a phase measurement associated with a best measured phase difference among a set of symbols associated with a reference signal resource of the reference signal.

Aspect 58: The apparatus of any of Aspects 47 to 57, wherein, based on the phase measurement request, the phase measurement report includes a representative phase measurement associated with a representative phase difference among a set of symbols associated with a reference signal resource of the reference signal.

Aspect 59: The apparatus of any of Aspects 47 to 58, wherein the phase measurement request includes a maximum number of subcarrier phase measurements for the UE to at least one of perform or report for a reference signal resource of the reference signal.

Aspect 60: The apparatus of any of Aspects 47 to 59, wherein, based on the phase measurement request, the phase measurement report includes a plurality of measurements associated with a reference signal resource of the reference signal.

Aspect 61: At least one non-transitory computer-readable medium containing instructions which, when executed by one or more processors, cause the one or more processors to perform a method according to any of Aspects 1 to 16.

Aspect 62: An apparatus comprising means for performing a method according to any of Aspects 1 to 16.

Aspect 63: At least one non-transitory computer-readable medium containing instructions which, when executed by one or more processors, cause the one or more processors to perform a method according to any of Aspects 17 to 30.

Aspect 64: An apparatus comprising means for performing a method according to any of Aspects 17 to 30

What is claimed is:

1. A method of wireless communication at a user equipment (UE), comprising:

transmitting, at the UE to a network entity, a phase measurement capability of the UE for subcarrier set pairs of different resources received by the UE, the different resources being associated with a reference signal, wherein the phase measurement capability includes:

a capability of the UE to determine phase differences between reference signal resources of a common set of reference signal resource sets associated with the reference signal;

a capability of the UE to determine phase differences between reference signal resources of different reference signal resource sets of a same transmission-reception point (TRP), the different reference signal resource sets being associated with the reference signal;

a capability of the UE to determine phase differences between reference signal resources of different reference signal resource sets of different transmission-reception points (TRPs), the different reference signal resource sets being associated with the reference signal; or a capability of the UE to determine phase differences between reference signal resources of different positioning frequency layer;

receiving, at the UE, a phase measurement request from a network entity for configuring phase measurements of the subcarrier set pairs of the different resources; and transmitting a phase measurement report to the network entity based on the phase measurement request, the phase measurement report including information associated with a measured phase difference of at least one subcarrier set pair associated with the different resources.

2. The method of claim 1, further comprising:

receiving, at the UE from the network entity, configuration information based on the phase measurement capability of the UE, the configuration information indicating to the UE to measure the at least one subcarrier set pair using multiple reference signal resources configured on common symbols or different symbols.

3. A method of wireless communication at a network entity, comprising:

receiving, at the network entity from a user equipment (UE), a phase measurement capability of the UE for subcarrier set pairs of different resources received by the UE, the different resources being associated with a reference signal, wherein the phase measurement capability includes:

a capability of the UE to determine phase differences between reference signal resources of a common set of reference signal resource sets associated with the reference signal;

a capability of the UE to determine phase differences between reference signal resources of different reference signal resource sets of a same transmission-reception point (TRP), the different reference signal resource sets being associated with the reference signal;

a capability of the UE to determine phase differences between reference signal resources of different reference signal resource sets of different transmission-reception points (TRPs), the different reference signal resource sets being associated with the reference signal; or a capability of the UE to determine phase differences between reference signal resources of different positioning frequency layer;

transmitting, at the network entity to the UE, a phase measurement request from a network entity for configuring phase measurements of the subcarrier set pairs of the different resources; and receiving, at the network entity from the UE, a phase measurement report to the network entity based on the phase measurement request, the phase measurement report including information associated with a measured phase difference of at least one subcarrier set pair associated with the different resources.

4. An apparatus for wireless communications, comprising:

a memory; and one or more processors coupled to the memory, the one or more processors being configured to:

transmit, to a network entity, a phase measurement capability of the apparatus for subcarrier set pairs of different resources received by the apparatus, the different resources be associated with a reference signal, wherein the phase measurement capability includes:

a capability of the apparatus to determine phase differences between reference signal resources of a common set of reference signal resource sets associated with the reference signal;

a capability of the apparatus to determine phase differences between reference signal resources of different reference signal resource sets of a same transmission-reception point (TRP), the different reference signal resource sets being associated with the reference signal;

a capability of the apparatus to determine phase differences between reference signal resources of different reference signal resource sets of different transmission-reception points (TRPs), the different reference signal resource sets being associated with the reference signal; or a capability of the apparatus to determine phase differences between reference signal resources of different positioning frequency layer;

receive a phase measurement request from a network entity for configure phase measurements of the subcarrier set pairs of the different resources; and transmit a phase measurement report to the network entity based on the phase measurement request, the phase measurement report including information associated with a measured phase difference of at least one subcarrier set pair associated with the different resources.

5. The apparatus of claim 4, wherein the one or more processors are configured to:

receive, from the network entity, configuration information based on the phase measurement capability of the apparatus, the configuration information indicating to the apparatus to measure the at least one subcarrier set pair use multiple reference signal resources configured on common symbols.

6. The apparatus of claim 4, wherein the one or more processors are configured to:

receive, from the network entity, configuration information based on the phase measurement capability of the apparatus, the configuration information indicating to the apparatus to measure the at least one subcarrier set pair use multiple reference signal resources configured on different symbols.

7. The apparatus of claim 4, wherein the one or more processors are configured to:

receive, from the network entity, configuration information based on the phase measurement capability of the apparatus, the configuration information indicating to the apparatus to measure the at least one subcarrier set pair using at least two different reference signal resources covering different parts of a bandwidth part (BWP).

8. The apparatus of claim 4, wherein the one or more processors are configured to:

receive, from the network entity, configuration information based on the phase measurement capability of the apparatus, the configuration information indicating to the apparatus to measure the at least one subcarrier set pair using at least two different reference signal resources cover different resource element (RE) allocations of a reference signal resource.

9. The apparatus of claim 4, wherein, based on the phase measurement request, the phase measurement report includes a phase measurement for each symbol of one or more symbols associated with a reference signal resource of the reference signal.

10. The apparatus of claim 4, wherein, based on the phase measurement request, the phase measurement report includes a phase measurement associated with a best measured phase difference among a set of symbols associated with a reference signal resource of the reference signal.

11. The apparatus of claim 4, wherein, based on the phase measurement request, the phase measurement report includes a representative phase measurement associated with a representative phase difference among a set of symbols associated with a reference signal resource of the reference signal.

12. The apparatus of claim 4, wherein the phase measurement request includes a maximum number of subcarrier phase measurements for the apparatus to at least one of perform or report for a reference signal resource of the reference signal.

13. The apparatus of claim 4, wherein, based on the phase measurement request, the phase measurement report includes a plurality of measurements associated with a reference signal resource of the reference signal.

14. The apparatus of claim 4, wherein, based on the phase measurement request, the phase measurement report includes a measurement for each symbol of a reference signal resource.

15. The apparatus of claim 4, wherein each measurement in the phase measurement report includes a timestamp corresponding to a symbol associated with each measurement.

16. An apparatus for wireless communications, comprising:

a memory; and one or more processors coupled to the memory, the one or more processors being configured to:

receive, from a user equipment (UE), a phase measurement capability of the UE for subcarrier set pairs of different resources received by the UE, the different resources be associated with a reference signal, wherein the phase measurement capability includes:

a capability of the UE to determine phase differences between reference signal resources of a common set of reference signal resource sets associated with the reference signal;

a capability of the UE to determine phase differences between reference signal resources of different reference signal resource sets of a same transmission-reception point (TRP), the different reference signal resource sets being associated with the reference signal;

a capability of the UE to determine phase differences between reference signal resources of different reference signal resource sets of different transmission-reception points (TRPs), the different reference signal resource sets being associated with the reference signal; or a capability of the UE to determine phase differences between reference signal resources of different positioning frequency layer;

transmit, to the UE, a phase measurement request from a network entity for configure phase measurements of the subcarrier set pairs of the different resources; and receive, from the UE, a phase measurement report to the network entity based on the phase measurement request, the phase measurement report including information associated with a measured phase difference of at least one subcarrier set pair associated with the different resources.

17. The apparatus of claim 16, wherein the one or more processors are configured to:

transmit, to the UE, configuration information based on the phase measurement capability of the UE, the configuration information indicating to the UE to measure the at least one subcarrier set pair use multiple reference signal resources configured on common symbols.

18. The apparatus of claim 16, wherein the one or more processors are configured to:

transmit, to the UE, configuration information based on the phase measurement capability of the UE, the configuration information indicating to the UE to measure the at least one subcarrier set pair use multiple reference signal resources configured on different symbols.

19. The apparatus of claim 16, wherein the one or more processors are configured to:

transmit, to the UE, configuration information based on the phase measurement capability of the UE, the configuration information indicating to the UE to measure the at least one subcarrier set pair using at least two different reference signal resources covering different parts of a bandwidth part (BWP).

20. The apparatus of claim 16, wherein the one or more processors are configured to:

transmit, to the UE, configuration information based on the phase measurement capability of the UE, the configuration information indicating to the UE to measure the at least one subcarrier set pair using at least two different reference signal resources covering different resource element (RE) allocations of a reference signal resource.

21. The apparatus of claim 16, wherein, based on the phase measurement request, the phase measurement report includes a phase measurement for each symbol of one or more symbols associated with a reference signal resource of the reference signal.

22. The apparatus of claim 16, wherein, based on the phase measurement request, the phase measurement report includes a phase measurement associated with a best measured phase difference among a set of symbols associated with a reference signal resource of the reference signal.

23. The apparatus of claim 16, wherein, based on the phase measurement request, the phase measurement report includes a representative phase measurement associated with a representative phase difference among a set of symbols associated with a reference signal resource of the reference signal.

24. The apparatus of claim 16, wherein the phase measurement request includes a maximum number of subcarrier phase measurements for the UE to at least one of perform or report for a reference signal resource of the reference signal.

25. The apparatus of claim 16, wherein, based on the phase measurement request, the phase measurement report includes a plurality of measurements associated with a reference signal resource of the reference signal.

* * * * *